US006978315B1

(12) United States Patent
Burrell

(10) Patent No.: US 6,978,315 B1
(45) Date of Patent: Dec. 20, 2005

(54) SYSTEMS, METHODS, AND COMPUTER PROGRAM PRODUCTS FOR REDIRECTING THE DISPLAY OF INFORMATION FROM A COMPUTER PROGRAM TO A REMOTE DISPLAY TERMINAL

(75) Inventor: Brandon Mitchell Burrell, Lawrenceville, GA (US)

(73) Assignee: American Megatrends, Inc., Norcross, GA (US)

( * ) Notice: Subject to any disclaimer, the term of this patent is extended or adjusted under 35 U.S.C. 154(b) by 707 days.

(21) Appl. No.: 09/685,131

(22) Filed: Oct. 10, 2000

Related U.S. Application Data

(60) Provisional application No. 60/216,901, filed on Jul. 7, 2000.

(51) Int. Cl.[7] .............................................. G06F 15/16
(52) U.S. Cl. ..................................... 709/246; 709/220
(58) Field of Search .............................. 709/205, 246, 709/220, 221; 707/513

(56) References Cited

U.S. PATENT DOCUMENTS

| | | | |
|---|---|---|---|
| 4,870,610 A | | 9/1989 | Belfer |
| 5,043,919 A | | 8/1991 | Callaway et al. |
| 5,065,343 A | | 11/1991 | Inoue |
| 5,157,606 A | | 10/1992 | Nagashima |
| 5,255,361 A | | 10/1993 | Callaway et al. |
| 5,416,903 A | | 5/1995 | Malcolm |
| 5,548,759 A | * | 8/1996 | Lipe ............................ 707/100 |
| 5,682,529 A | | 10/1997 | Hendry et al. |
| 5,754,858 A | * | 5/1998 | Broman et al. .............. 717/111 |
| 5,758,154 A | * | 5/1998 | Qureshi ........................ 713/1 |
| 5,812,964 A | * | 9/1998 | Finger .......................... 704/7 |
| 5,878,248 A | | 3/1999 | Tehranian et al. |
| 5,913,040 A | | 6/1999 | Rakavy et al. |
| 5,923,844 A | | 7/1999 | Pommier et al. |
| 5,974,454 A | * | 10/1999 | Apfel et al. ................. 709/221 |
| 6,014,701 A | * | 1/2000 | Chaddha ...................... 709/226 |
| 6,065,041 A | * | 5/2000 | Lum et al. ................... 709/203 |
| 6,141,666 A | * | 10/2000 | Tobin .......................... 715/513 |

* cited by examiner

Primary Examiner—Bunjob Jaroenchonwanit
(74) Attorney, Agent, or Firm—Alston & Bird LLP

(57) ABSTRACT

The present invention provides systems, methods, and computer program products for redirecting the output of the computer program to a remote display terminal. The systems, methods, and computer program products of the present invention provide a method by which all text on a host system may be redirected and displayed at a remote location and representations of graphical images on a host system may be redirected and displayed at a remote location. The system of the present invention includes a display management module stored on a computer-readable medium in communication with an output of the computer program and the remote display terminal. Associated with the display management module are data modules containing text and graphical representation data used by the computer program to display information. The system of the present invention also includes an output redirection handler connected between the display management module and a data communication link to the remote display terminal. Connected to the opposed end of the communication link is a remote display handler for controlling the display of information on the remote display terminal. To redirect the display of information to the remote display terminal, the display management module receives commands to display text and graphical images from the computer program. Based on these commands, the display management module provides commands, text from the data modules, and data indicating size and position of the graphical images to the output redirection handler for displaying information on the remote display terminal. The output redirection handler formats the command and data for transmission across the data communication link, and the remote display handler receives the display data and controls the remote display terminal to display the information.

69 Claims, 8 Drawing Sheets

SYSTEMS, METHODS, AND COMPUTER PROGRAM PRODUCTS FOR REDIRECTING THE DISPLAY OF INFORMATION FROM A COMPUTER PROGRAM TO A REMOTE DISPLAY TERMINAL

CROSS-REFERENCE TO RELATED APPLICATIONS

The present application claims priority from U.S. Provisional Application Ser. No. 60/216,901 entitled SYSTEMS, METHODS, AND COMPUTER PROGRAM PRODUCTS FOR MANAGING THE DISPLAY OF INFORMATION OUTPUT BY A COMPUTER PROGRAM filed Jul. 7, 2000, the contents of which are incorporated herein by reference.

FIELD OF THE INVENTION

The present invention relates generally to the display of information from a computer program on a remote display terminal. More particularly, the present invention relates to a system having a display management module and an output redirection handler connected to the computer program and the remote display terminal. The display management module, based on commands from the computer program, provides commands and text data from data modules associated with the display management module to the output redirection handler for displaying information on the remote display terminal.

BACKGROUND OF THE INVENTION

Many computer programs operate in conjunction with a display terminal to provide information to the user of the computer program concerning the operation of the computer program and to query the user for input of information. For example, Basic Input/Output System (BIOS) software is used in many computer systems to initialize operation of the computer system when it is either powered on or is reset. The BIOS software typically performs a power on system test (POST) that checks the status of components of the computer system to determine whether certain peripherals are installed. The BIOS software also ascertains the amount of memory resources the computer system has, performs diagnostic testing on the computer components and peripherals, and installs drivers for interacting with the peripherals. Further, the BIOS software also includes a setup mode that allows the user to alter the configuration of some of the parameters of the BIOS software.

Importantly, during POST, as the BIOS software initializes the components and peripherals and performs system checks, information concerning these operations is displayed to the user. This information allows the user or computer support personnel to determine whether all of the computer components and peripherals are properly installed and whether there are errors associated with these components and peripherals. Further, in the setup mode, the parameters of the BIOS software are displayed to the user so that the user may confirm or alter these parameters. Additionally, the BIOS software may display logos associated with the developer of the BIOS software and/or the owner of the computer system. Further, the BIOS software may display progress bars and boxes.

In conventional computer programs, such as BIOS software, the text and graphical data used for displaying information on the display terminal is typically located within the source code of the computer program. For example, text information for displaying text data strings on the display terminal is typically embedded in the source code. Further, graphical data for logos and progress bars is also embedded in the source code. The location of the text and graphical information in the source code is problematic for many reasons.

For instance, the addition of the text and graphical data in the source code increases the overall size of the code. The display of text and graphical data requires not only the character codes for the data but also font, color, and various other attributes associated with the format in which the data is displayed.

Further, and more importantly, the embedding of the text and graphical data in the source code makes updating of the text and graphics displayed by the computer program much more difficult. For example, an important limitation to the export of most computer systems and computer programs to other countries is the translation of the outputs displayed to the user in a language that is understandable to the user of the computer system or computer program. As many software programs embed the textual and graphical information in the source code of the computer program, to modify the program to display the information in the proper language for the user, the source code must be reprogrammed with the appropriate text and graphics and recompiled. Additionally, besides the effort of rewriting the source code, multiple copies of the modified source code must be maintained for each of the languages that the source code has been rewritten. This becomes burdensome as updates to the source code must be performed for each language version of the source code, and each version of the source code must be maintained in storage. For large-scale systems involving millions of lines of code and modules, the maintenance, updating, and storage requirements for all of the different language versions of the code may be enormous.

An additional problem is that computer programs, such as BIOS software, typically display graphical information such as boxes, progress bars, and logos. The code for these graphics is also typically embedded in the source code. As such, changes to the graphic displays or logos also require rewriting of the source code. This creates problems for customization of the output displays. Specifically, it may be advantageous to display different graphics for different customers. For example, some customers may wish to include their logos in the display as the computer program operates.

Similarly, the language data is typically embedded in the source code of the computer program along with a specific font for displaying the text. As such, desired changes of the font of either particular text or all of the text in the source code requires reprogramming and recompiling of the source code.

In addition to the problems associated embedding the text and graphical data in the source code of the program is the added problem that some languages use graphical characters, as opposed to ASCII characters. The Asian language of Kanji, for example, includes graphical characters that require a double byte character set (DBCS) for display. These graphical characters are typically data storage intensive. As such, embedding DBCS characters and their associated font data in the source code of the computer program can dramatically increase the overall size of the program.

In addition to the problems associated with storage and accessibility of text and graphical data, there are also problems associated with redirection of displayed information to a remote display. Specifically, there are many applications in which it is advantageous to redirect the displayed information to a terminal other than the terminal associated with the computer system. Additionally, in some instances, it is advantages to redirect the display to a different location such that the user may interact with the computer without requiring the user to be physically located proximate to the computer system.

Although display redirection is advantageous, there are some drawbacks. Specifically, the communication link between the computer system and the remote display may be any of a number of different mechanisms. For example, the communication link may be either a serial port, parallel port, network port, etc. In light of this, many conventional computer programs are programmed to include the proper protocol for transmitting the information to the remote display using one of these data communication formats. As such, there must be either separate versions of the program each having code embedded in the source code or different modules embedded in the source code for transmitting the information in the proper communication format. As such, changes in the code for transmitting the display information must be implemented by altering the source code associated with the program, which can again become burdensome.

SUMMARY OF THE INVENTION

As set forth below, the systems, methods, and computer program products of the present invention overcome many of the deficiencies identified with the display of information from a computer program on a display terminal. In particular, the present invention provides systems, methods, and computer program products for managing the display output of computer programs. Further, the present invention provides data structure, methods, and computer program products for storing data strings used by a display management module to display information on a display terminal. Additionally, the present invention provides systems, methods, and computer program products for redirecting the display of information from a computer program to a remote display terminal.

Specifically, in one embodiment, the present invention provides a system containing a display management module that interfaces with the computer program and the display terminal. The display management module is an intermediate module that interprets display commands from the computer program and controls the display to output the desired information. The system further includes data modules stored on a computer-readable medium containing text and graphical data used by the computer program to display information on the display terminal. Individual 16 bit identification numbers called tokens are associated with the text strings located in the data modules.

In this embodiment, the source code for the computer program includes the tokens associated with the data strings stored in the language modules, instead of the associated data strings themselves. In operation, when the computer program wishes to display information on the display terminal, the computer program transmits the token associated with the data string to the display management module. The display management module retrieves the data string associated with the token and also any associated font data. Using the data string and the font data, the display management module displays the information on the display terminal.

Advantageously, because the data strings are tokenized and stored in a computer-readable medium separate from the source code of the computer program, these data strings can be easily updated without requiring reprogramming of the source code. Thus, if a software developer wishes to change the text of the message displayed to the user, or the logo, or the text box displayed to the user, the developer need only change the data string in the appropriate module and not reprogram the source code associated with the computer program. Further, because the font data associated with each character of the data strings is stored in the font and language modules, as opposed to the source code of the computer program, the overall size of the source code of the computer program is reduced.

Additionally, the display management module may also be used to change the language with which data strings are displayed. Specifically, the display management module may operate in conjunction with a plurality of language data modules, where each language data module includes data strings representing the language data translated into a selected language. The system of this embodiment further includes a main language module header stored on a computer-readable medium and associated with the display management module. The main language module header includes individual pointers indicating the location in a computer-readable storage medium in which each language data module is located.

In operation, to display a data string in a selected language, the display management module receives a token and an indication of the desired language. The display management module accesses the main language module header and retrieves the pointer associated with the language data module corresponding to the desired language. Further, the display management module, using the pointer, accesses the language data module, retrieves the data string associated with the token, and displays the data string on the display terminal in the desired language.

In addition to providing systems, methods, and computer program products for managing the display of information on a display terminal, the present invention also provides data structure, methods, and computer program products for storing data strings used by a display management module to display information on a display terminal.

Specifically, the data structure of the present invention includes the data strings used by the computer program to display information on a display terminal. The data strings are stored in the data structure and are associated with unique tokens located in the computer program. The data strings are accessed by the display management module based on the tokens and used for display. As discussed above, by placing the data strings in individual data modules, as opposed to embedding them in the computer program, the data strings are accessible for updating and alteration.

Specifically, in one embodiment, the present invention provides a data structure stored on a computer-readable medium having a string data area that includes data strings representing language data. Each character of each data string is a character selected from the group consisting of standard ASCII, extended ASCII, and double byte characters (DBCS). The characters in a data string that are standard ASCII (less than code 80 hexadecimal) or extended ASCII (codes greater than or equal to 80 hexadecimal) with codes less than a predetermined escape code are stored by their ASCII representations in the string data area. Extended ASCII characters having characters codes greater than or equal to the escape code are stored as two-byte codes with the ASCII character code preceded by the escape code. Further, the double byte characters are encoded sequentially as two-byte codes whose starting value is found by taking the value one greater than the escape code and making the next byte zero. For example, if the escape code is selected to be 0E0 hexadecimal then the first DBCS character code would be 0E100, and the 16 bit values may therefore be incremented sequentially from 0E101 to 0FFFF hexadecimal.

In order to differentiate between codes used for DBCS characters and those used for extended ASCII, the extended ASCII characters must be preceded by the escape code. For example, when processed byte by byte, the code 0E5 h encountered by itself in the string data would indicate the start of a 16-bit DBCS character code, such that 0E5 and the following byte would represent the code. In order to represent the actual extended ASCII character of 0E5 hexadecimal, it would be preceded by the escape code, as in 0E0E5. This encoding scheme therefore allows all 256 ASCII codes, as well as a range of 16 bit DBCS character codes to coexist within and be extracted from the string data. Further, the data structure includes an extended ASCII font data area stored on a computer-readable medium for storing font data related to extended ASCII characters that are not displayable using standard ASCII characters from the font module, and a double byte character font data area stored on a computer-readable medium for storing font data related to characters that are double byte characters.

In this embodiment of the present invention, to display a data string, the display management module receives the specific token associated with the data string to be displayed and a command to display the data string from the computer program. Based on the token, the display management module accesses the location in the string data area where the data string associated with the token is located. Using the rules set by the encoding scheme, the display management module interprets the code stored for each character and sequentially displays each character of the data string on the display terminal.

The above described data structure is advantageous for many reasons. Specifically, as discussed, the data structure may include ASCII, extended ASCII, and DBCS characters. As such, the data structure may be designed to contain data strings for not only languages that require textual representations in ASCII and extended ASCII characters, but also for languages, such as Kanji, that require graphical characters that are displayed using DBCS characters. Importantly, the individual characters of each data string are encoded in the data structure, such that storage for the data structure is minimized, but contains all of the needed characters for displaying the data strings in the desired language.

Specifically, because there are 256 standard and extended ASCII characters and 65,536 possible DBCS characters, it is typically not feasible to encode all of the possible characters in the data structure. For this reason, in one embodiment, the data structure is formatted such that all of the standard ASCII characters and some of the extended ASCII characters are encoded into one-byte codes by their associated ASCII code, and those extended ASCII characters whose codes are used in the range reserved for DBCS characters are encoded into a two byte codes, whereby the extended ASCII code is preceded by the escape code. Therefore, the encoding scheme distinguishes the extended ASCII characters in the data strings from the DBCS characters, such that the display management module to can differentiate between normal ASCII character codes and DBCS characters.

Further, the data structure also includes extended ASCII and DBCS font data areas for storing the font data associated with extended ASCII and DBCS characters. This is advantageous because the font data associated with each DBCS character is relatively large and requires added storage. For this reason, in some embodiments, it is advantageous to only store the font data associated with the DBCS characters present in the data strings, thereby minimizing storage space. Additionally, in some instances, the data structure need not contain font data for extended ASCII characters if the extended ASCII characters for the language are displayable with the standard ASCII characters set included in the font module.

As such, in one embodiment of the present invention, the double byte characters of a data string are encoded with unique 16 bit codes that are stored in the string data area. Further, font data associated with the double byte characters is stored in the double byte character font data area, and font data for extended ASCII characters is stored in the extended ASCII font data area, if the extended ASCII character is not displayable with a standard ASCII set in the font module.

As an example, in one embodiment, the double byte characters are sequentially encoded such that the first DBCS character encountered is represented by the two-byte code E100 in hexadecimal, where E0 hexadecimal is the escape code. The remaining unique DBCS characters are encoded with sequential 16 bit code values as they are encountered during the encoding process. Because the DBCS characters are encoded in the data string area as code values of E100 to FFFF hexadecimal, the extended ASCII characters having ASCII values in the range of E0 to FF hexadecimal must be designated in the data string area such that they are distinguishable from DBCS characters. As such, in this embodiment, the extended ASCII characters having ASCII values in the range of E0 to FF hexadecimal are encoded in the string data area with an escape code of E0 in hexadecimal preceding the ASCII representation of the extended ASCII character. Further, if the language in which the characters are to be displayed is not displayable with the standard ASCII included in the font module, the font data associated with the extended ASCII characters is stored in the extended ASCII font data area. With respect to the DBCS font data, the font data for each DBCS character located in the data strings is sequentially stored in the DBCS font data area, such that the location of the data in the DBCS font data area corresponds with the two-byte code value associated with DBCS character stored in the data string area.

In operation, to display a data string, the display management module receives the token associated with the data string and the command to display the data string from the computer program. The display management module accesses the location in the string data area where the data string is located and sequentially displays characters of the data string on the display terminal. If a character in the data string is less than E0 hexadecimal, then the character is either a standard ASCII character or an unencoded extended ASCII character. In this instance, the display management module retrieves the ASCII character code stored in the string data area and displays the character on the display terminal. If the data string is equal to E0 hexadecimal, then the next character in the data string is an extended ASCII character having an ASCII code in the range of E0 to FF hexadecimal. In this instance, the display management module retrieves the character code stored in the next byte of the string data area for display. In either case, if the character is an extended ASCII character, it is first determined whether the extended ASCII character is displayable with the standard ASCII character set in the font module. If it is, then the extended ASCII character is displayed using standard ASCII font from the font module. If not, the display management module uses the character code to locate the extended font data stored in the extended ASCII font data area to display the extended ASCII character on the display terminal.

If a character in the data string is E1 hexadecimal or greater, it signals the start of a DBCS character. The display management module takes this value and the next byte to construct a 16-bit code. The display management module subtracts E100 hexadecimal from the 16-bit code and multiplies this value by the pixel display size in bytes of a double byte character. The calculated value represents the location offset of the double byte character font data for the character stored in the double byte character font data area. The display management module uses the calculated value to locate and use the double byte character font data stored in the double byte character font area to display the double byte character on the display terminal.

In addition to including data structures containing language data, the present invention may also include data structures containing font data and logo data. For example, as mentioned above, the present invention may include a data structure having a font module stored in a computer-readable medium and associated with the display management module. The font module contains font data for displaying standard ASCII characters. Importantly, by placing the font data for standard ASCII characters in a separate module, the font used to display ASCII characters can be readily changed simply by changing the pointer to the active font module.

In some embodiments, the data structure may further include a plurality of font modules each containing font data for displaying ASCII characters in a different font. In this embodiment, the computer program provides an indication to the display management module indicating the selected font for displaying the data string in the form of a pointer to the selected font module. The display management module accesses the font data module associated with the preselected font, locates the font data associated with the ASCII character in the font module and using the font data displays the ASCII character on the display terminal.

In one embodiment of the present invention, the data structure may also include a logo module stored in a computer-readable medium and associated with the display management module. In this embodiment, the logo module contains graphical data for display of at least one logo/graphical image. To display the logo, the display management module locates the graphical data associated with the logo in the logo module and using the logo data displays the logo on the display terminal. Further, if the logo module includes more than one logo, the display management module may display either one, some, or all logos simultaneously. Also, using commands to the display management module, individual logos may be enabled or disabled.

In addition to displaying text and logos, the display management module may also be used to display progress bars. For example, in one embodiment, the display management module may display either a gradient progress bar or a filled progress bar as known in the art. The display management module may also display text boxes on the display terminal having a border defining an area on the display terminal. Further, in some embodiments, the display management module may define a scrollable area within the display of the display terminal. In this embodiment, the display management module first defines an area on the display terminal. The display management module displays data within the defined area of the display terminal and can scroll the data displayed within the defined area, while any data displayed on other portions of the display terminal remain at the same position.

In addition to providing systems, methods, and computer program products for displaying information from a computer program, the present invention also provides systems, methods, and computer program products for redirecting the output of the computer program to a different display. Specifically, the systems, methods, and computer program products of the present invention provide a method by which all text and graphical images on a host system may be redirected and displayed or represented at a remote location. Importantly, the display management module of the present invention provides commands and data to an external redirection handler module, that when properly interpreted and transmitted, allow for the display of information from the computer program to the remote display.

These and other advantages are realized by a system for redirecting the display of information from a computer program to a remote display terminal. The system includes a display management module stored on a computer-readable medium in communication with an output of the computer program and the remote display terminal for displaying data from the computer program on the remote display terminal. Associated with the display management module are data modules stored on a computer-readable medium containing text and graphical data used by the computer program to display information. Further, connected to the display management module is an output redirection handler stored on a computer-readable medium. A data communication link is connected between the output redirection handler and the remote display terminal. In one embodiment, the system of the present invention further includes a remote display handler stored on a computer-readable medium in electrical connection with the data communication link and the remote display terminal.

In operation, the display management module receives commands to display text and graphical data from the computer program. Based on the commands, the display management module provides commands and text data from the data modules to the output redirection handler for displaying information on the remote display terminal.

As discussed, the data communication link provides a connection between the display management module and the remote display terminal. The data communication link may be a wide variety of data links. For example, in some embodiments, the data communication link may be either a parallel, serial, or network data link. As such, the output redirection handler of the present invention is designed such that it receives commands and data from the display management module and formats the commands and data for transmission across the data communication link depending on the type of communication link.

As detailed above, the display management module outputs commands and data to the output redirection handler for transmission to the remote display terminal. As time is required to transmit data from the output redirection handler to the remote display terminal, including time to convert the data for transmission across the data communication link, it may be advantageous to reduce the amount of data transmitted. For example, there are certain attributes associated with the display on the display terminal. For data updates to the display that do not alter the attributes associated with the display, it may be advantageous to forego resending the attribute with the data. As such, in one embodiment, the remote display handler stores a current attribute value representing an attribute of a current view displayed on the remote display terminal. Thus, subsequent commands to display data on the remote display terminal that do not alter the attribute of the display do not require transmittal of the attribute variable.

Similarly, in most cases, such as when displaying data strings, characters are displayed consecutively in a row. Since the characters are displayed consecutively in a row, it may be advantageous to store the current cursor position at the remote display terminal, such that consecutive characters sent for display do not require the sending of the cursor position for displaying the character. As such, in one embodiment, the remote display handler stores a value representing the current position of a cursor on the remote display terminal, such that subsequent commands to display data on the remote display terminal do not require data concerning cursor position.

DETAILED DESCRIPTION OF THE INVENTION

Figure 1:
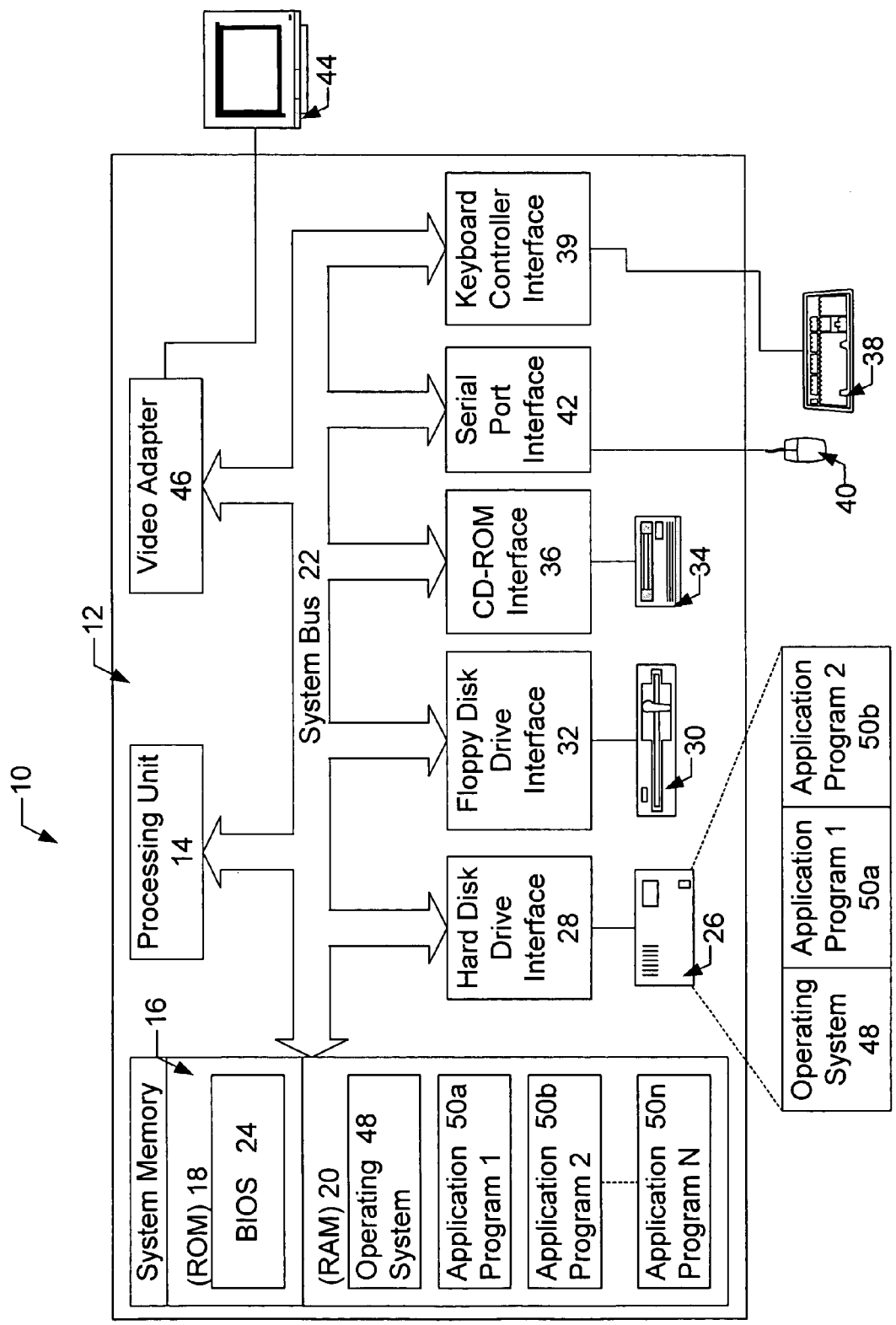
FIG. 1 is a block diagram of a computer that provides the operating environment for the systems, methods, and computer program products of the present invention, according to one embodiment.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As discussed above and provided in more detail below, the present invention provides systems, methods, and computer program products for managing the display of information provided by a computer program on a display terminal. Importantly, the present invention provides a display management module that operates as an intermediate module between the computer program and the display terminal. The display management module interprets display commands from the computer program and controls the display terminal to display the desired information.

Associated with the display management module are a group of data modules that advantageously include the text and graphical data used by the computer program to display information on the display terminal. The text and graphical data are stored in these data modules, and therefore, the computer program does not have to contain the text and graphical data needed for displaying information on the display terminal. In the case of text strings, data in the computer program can be replaced by identification numbers called tokens that allow the display management module to locate the text string in the data module. As such, to display information on the display terminal, the computer program outputs to the display management module a command to display a string and the token associated with the data string to be displayed. Based on the token, the display management module retrieves the data string from the data module and displays the data string on the display terminal.

The removal of the text and graphical data from the source code of the computer program provides several advantages. For instance, because the source code of the computer program does not contain the text and graphical data and the fonts associated with the data strings, the overall size of the source code is minimized. Further, as the text and graphical data originally located in the source code of the computer program is now stored in accessible modules, the text and graphical data can be more easily updated. Additionally, in some embodiments, the display management module may be associated with several different language data modules, where each language data module contains the data strings used by the computer program stored in a particular language. In this embodiment, the language with which the data strings are displayed may be changed by merely changing the language data module used by the display management module to display data on the display terminal.

The present invention also provides data structure, methods, and computer programs for storing text and graphical data used by a computer program to display information on a display terminal. Importantly, the present invention provides a data structure in which the data strings used by the computer program are stored and referenced by unique 16 bit identifiers called tokens. The data structure may include not only the 256 ASCII characters displayable with the standard font module, but also a different set of characters in the range 80-FF hexadecimal (referred to as non-standard extended ASCII), if a particular language requires them. The data structure may also include double byte characters (DBCS) that are used for graphical languages, which are two characters wide and are addressed using 16 bit character codes. As such, the data structure supports not only languages that use ASCII and non-standard extended ASCII characters, but also graphical languages, such as Kanji, that use DBCS characters.

Additionally, in some embodiments, the data structure also includes font areas for storing font data associated with extended ASCII and DBCS characters. In some embodiments, the data structure may include font data only for those extended ASCII characters that are not displayable using the extended ASCII characters in the font module. Further, the data structure may include font data for all possible DBCS characters. However, in some embodiments, the font areas may only include font data for the DBCS characters that are used in the data strings stored in the data string area. This embodiment is advantageous, as font data for displaying DBCS characters is relatively large. By storing only the font data associated with the DBCS characters to be displayed, data storage is minimized.

Further, the present invention provides systems, methods, and computer program products for redirecting the display of information from a computer program to a remote display terminal. Specifically, the systems, methods, and computer program products of the present invention provide a method by which all text on a host system may be redirected and displayed at a remote location and representations of graphical images on a host system may be redirected and displayed at a remote location. Importantly, the display management module of the present invention provides commands and data to an external redirection handler module, that when properly interpreted and transmitted, allow for the display of information from the computer program to the remote display.

As described below, the systems, methods, and computer program products of the present invention operate in conjunction with a computer program to display information on a display terminal. In typical embodiments, the systems, methods, and computer program products are implemented in a computing system, such as a personal computer or main frame computing system. However, it should be understood that the systems, methods, and computer program products of the present invention are not limited to any particular computer or apparatus. Rather, the systems, methods, and computer program products described herein may be modified to operate in various types of general purpose computing systems. Similarly, it may prove advantageous to construct a specialized computing system to perform the methods described herein.

Additionally, in the detailed discussion provided below, the systems, methods, and computer program products of the present invention are described in conjunction with BIOS software program. It must be further understood that the systems, methods, and computer program products of the present invention are not limited to use with BIOS, but may instead be used with a wide variety of computer programs for management of the display of information on a display terminal.

As an example, FIG. 1 is a typical computing environment in which the systems, methods, and computer program products of the present invention may be implemented. Specifically, the computing environment 10 includes a computer 12. The computer includes a processing unit 14 and memory 16, (including read only memory (ROM) 18 and random access memory (RAM) 20), connected to the processing unit by a system bus 22. The BIOS software 24 for the computer is stored in ROM. The computer also includes a local hard disk drive 26 connected to the system bus via a hard disk drive interface 28, a floppy disk drive 30 connected to the system bus via a floppy disk drive interface 32, and a CD-ROM drive 34 connected to the system bus via a CD-ROM interface 36. Further, connected to the computer is a keyboard 38 connected through a keyboard controller interface 39 and a mouse 40 connected to the system bus via a serial port interface 42. For displaying data to the user of the computer, a monitor 44 or other kind of display device is connected to the system bus via a video adapter 46. Additionally, program modules, such as an operating system 48 and application programs 50a–50n, are stored on the hard disk drive 26. During operation, these programs may be temporarily stored in RAM.

As illustrated below, the present invention provides systems, methods, and computer program products for managing the display of information from a computer program to a display terminal. The system of the present invention includes a display management module and various data modules stored on a computer-readable medium that interacts with a computer program and display terminal. With reference to FIG. 1, in instances in which the present invention is implemented to operate with BIOS, the display management module and data modules of the present invention are typically stored in ROM in a compressed form. When initialized, the display management module, as well as the various data modules, are extracted from ROM, decompressed, and stored in RAM. In operation, the system of the present invention receives commands from the BIOS program illustrated in FIG. 1. Based on the commands from the computer program, the system of the present invention displays text and graphical information on the display terminal.

Figure 2:
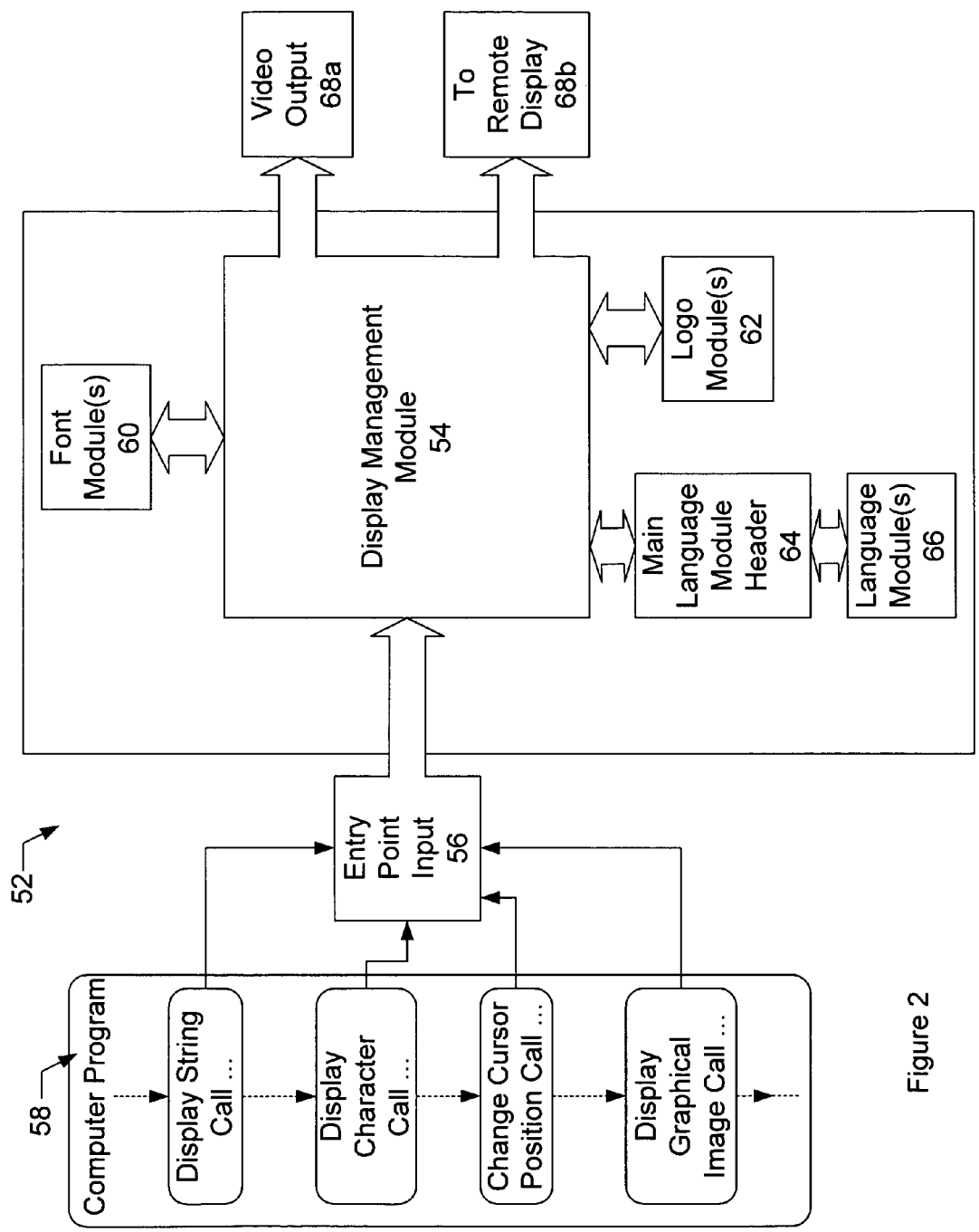
FIG. 2 is a block diagram of an apparatus for managing the display of information output by a computer program on a display terminal according to one embodiment of the present invention.

With reference to FIG. 2, a system 52 for managing the display of information from a computer program according to one embodiment of the present invention is shown. The system of this embodiment includes a display management module 54, having an input entry point 56 for receiving and transmitting information from a computer program 58, such as the BIOS program 24 illustrated in FIG. 1. The computer program provides various commands to the display management module, such as "display string," "display character," "change cursor position," "display graphical image," etc. Connected to the display management module may be several different data modules. Specifically, the system of the present invention may include either one or several data modules, such as either one or several font modules 60, either one or several logo modules 62, a main language module header 64, and either one or several language modules 66. Additionally, the system 52 also includes output 68a for connection to the local display terminal, such as the display terminal 44 shown in FIG. 1, and output 68b for connection to a remote display terminal. Importantly, the text and graphical data used by the display management module is located in the data modules.

Figure 3:
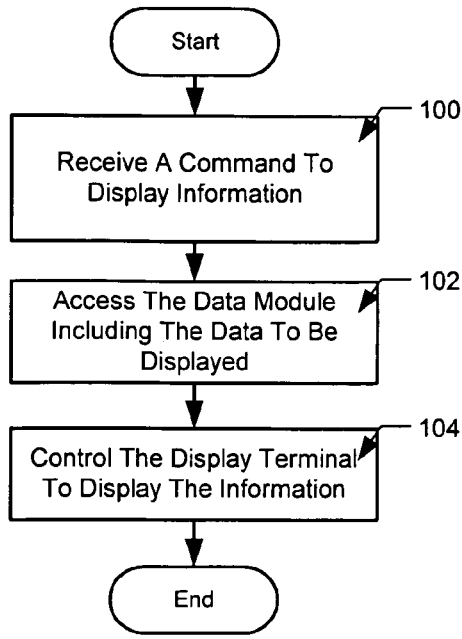
FIG. 3 is a block diagram of the operations performed to manage the display of information output by a computer program on a display terminal according to one embodiment of the present invention.

With reference to FIG. 3, in operation, to display information on the display terminal, the computer program sends a command to display information. (See step 100). Based on the command, the display management module accesses the data module including the data to be displayed. (See step 102). The display management module then controls the display terminal to display the information. (See step 104).

Advantageously, because the text and graphical data used by the computer program to display information on the display terminal is located in the data modules, as opposed to the source code of the computer program, the size of the source code is minimized. Further, because the text and graphical data are located in readily accessible modules, the data is more easily updated or altered.

In addition to minimizing the overall size of the source code of the computer program and providing the text and graphical data for updating and alteration, the systems, methods, and computer program products of the present invention also provide for the display of both text and graphical data, display of data strings in different languages, display of multiple logos, display of progress bars, scrollable text windows, etc.

As discussed, the systems, methods, and computer program products of the present invention also minimize the storage space needed to maintain the text and graphical data in a data module. For example, in one embodiment, the system of the present invention includes a language data module 66 that includes all of the data strings used by the computer program to display information on the display terminal. The data strings are stored in the language data module, and individual tokens are associated with the data strings, such that the data strings can be addressed by the display management module and displayed. In this embodiment, the language data module is an independent and self-contained binary. The language data module can contain ASCII characters in the range 00–07 F hexadecimal for the display of alphanumeric characters, herein referred to as "standard ASCII characters." Additionally, the language module may include ASCII characters in the range 80-OFF hexadecimal that include line drawing characters and special characters such as a degree symbol (°) or a check mark (√), herein referred to as "extended ASCII characters". Further, for some languages, such as the Asian language of Kanji, that are graphical in nature, the language data module includes DBCS characters.

The data structure of the language data module of the present invention provides several advantages. Specifically, each of the characters of each data string is encoded in the language data module, such that the display management module can readily determine whether the character is a standard ASCII character, extended ASCII character, or DBCS character. Additionally, the language data module includes an extended ASCII font area for storing font data for extended ASCII characters that cannot be displayed using the standard font module. Further, the language data module includes a DBCS font area for storing font data for DBCS characters if they are present in the data strings stored in the language data module. Further, in one embodiment of the present invention, the language font data module only includes font data associated with the DBCS characters that appear in the data strings stored in the language data module, thereby minimizing data storage.

Figure 4:
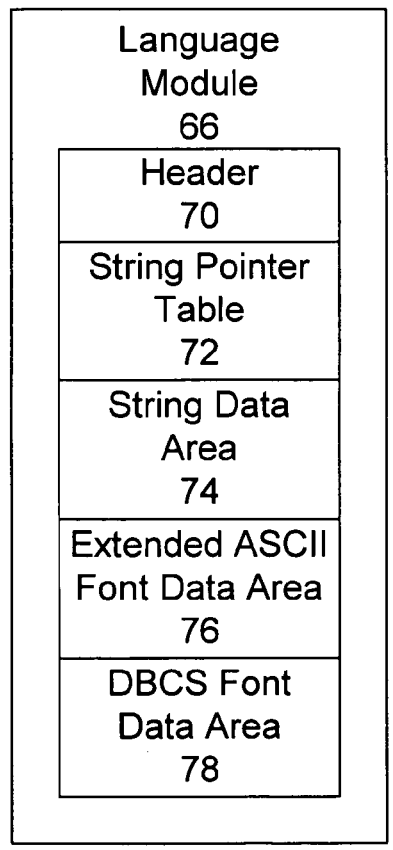
FIG. 4 is a block diagram of the data structure of language data module that includes the data strings used by the computer program to display information on the display terminal according to one embodiment of the present invention.

A description of the data structure of a typical language data module according to the present invention is provided below. With reference to FIG. 4, in one embodiment, the language data module 66 of the present invention includes a header 70, a string pointer table 72, a string data area 74, an extended ASCII font data area 76, (if the language is not displayable with extended ASCII characters from the standard font module), and a DBCS font data area 78, (if the language requires DBCS fonts).

Tables 1 and 2 respectively illustrate the contents of the header 70 and string pointer table 72 for a typical language data module. Specifically, the header 70 includes a signature to identify the module and language identification to identify the language associated with the module. Importantly, the header also includes flags that indicate whether the language associated with the language data module includes its own set of extended ASCII characters and DBCS characters. Further the header includes offsets addressing the location of the string pointer table, extended font data area, and DBCS font data area.

TABLE 1

Header

| Offset | Size | Definition |
|---|---|---|
| 0000h | DWORD | 'LANG' signature to identify presence of module |
| 0004h | WORD | Language ID |
| 0006h | DWORD | Flags<br>Bit 0: ExtendedASCIIFlag<br>0 = Language uses standard extended ASCII<br>1 = Language uses different extended ASCII<br>Bit 1: DBCSFlag<br>0 = Language does not use DBCS characters<br>1 = Language uses DBCS characters<br>Bit 2: Default language identifier<br>0 = this language is not used as default<br>1 = this language is the default<br>All other bits reserved |
| 0008h | DWORD | 32 bit offset to string pointer table (from offset 0000h of the module) |
| 000ch | DWORD | 32 bit offset to extended font data (from offset 0000h of the module) Value is irrelevant if the ExtendedASCIIFlag is 0 |
| 0010h | DWORD | 32 bit offset to DBCS font data (from offset 0000h of the module) |
| 0014h | DWORD | 32 bit offset to first non-runtime string in string data area (from start of string pointer table) |

With reference to Table 2, the string pointer table includes a list of pointers that identify where each data string is located in memory.

TABLE 2

String Pointer Table

| Offset | Size | Definition |
|---|---|---|
| 0000h | WORD | String 0000 pointer (from start of String Pointer Table) |
| 0002h | WORD | String 0001 pointer (from start of String Pointer Table) |
| (n−1)×2 | WORD | String n pointer |

As discussed above, the language data module includes all of the data strings that are displayed by the computer program. The data strings stored in the language data module may consist of normal ASCII characters (00–7 F hexadecimal), extended ASCII characters (80-FF hexadecimal), or 16 bit DBCS characters (0000-FFFF hexadecimal). Importantly, in choosing an encoding scheme for encoding the characters of the data string, the encoding must be uniform for all language data modules regardless of the different types of characters, (i.e., ASCII, extended ASCII, and DBCS), used to display the language. For example, the same encoding scheme should be used for encoding the characters in a language data module that displays data strings in English as for the characters of a language data module that displays data strings in Kanji, such that the display management module can easily retrieve the data strings, decode, and display them regardless of which language is selected.

In order for the display management module to process data strings for display in the display terminal, the data strings must be encoded in a manner that allows the display management module to differentiate between ASCII character codes and DBCS character codes.

In light of this, in one embodiment of the present invention, the individual characters of the each data string are encoded in the language data module such that standard ASCII characters and most of the extended ASCII characters are represented by their normal one-byte codes, while the remaining extended ASCII characters and all DBCS characters are encoded as two bytes. To further clarify, in order to differentiate between single byte ASCII codes and double byte DBCS codes, a one-byte escape code is chosen such that all codes above it are used for the encoding of DBCS characters. The escape code itself is used to encode any single extended ASCII characters that may exist in this DBCS range, such that the resulting code is a two-byte value with the escape code preceding the ASCII code for the extended ASCII character. DBCS characters are encoded with sequential two-byte codes, whereas the first two-byte code consists of the value following the escape code as the first byte and a value of zero as the second byte. Each additional DBCS code is sequentially encoded following the first code value. By lowering or raising the value of the escape code, the number of unique DBCS characters that may be encoded in the language strings can be increased or decreased.

Provided below is one example of an encoding scheme for encoding the ASCII extended and DBCS characters in a language data module. This scheme provides a data structure in which the ASCII, extended ASCII, and DBCS characters are encoded, such that the display management module may distinguish the different characters by code. Further, the scheme allows for encoding the standard ASCII characters and some of the extended ASCII characters with one-byte code values and some of the extended ASCII and DBCS characters with two-byte code values. It must be understood that this is only an example of an encoded scheme for encoding the data strings in the language data module and is merely provided to present a clear understanding of the invention.

In this embodiment of the present invention, the escape code is chosen as E0 hexadecimal. In this embodiment, all standard ASCII characters and extended ASCII characters having ASCII code less than E0 hexadecimal are encoded using their one byte ASCII codes. Further, extended ASCII characters having ASCII codes at least as great as E0 hexadecimal are encoded as a two-byte code containing the ASCII code for the extended ASCII character preceded by the escape code E0 hexadecimal. For example, the extended ASCII value of F8 would be encoded as E0 F8. Additionally, the DBCS character codes are encoded sequentially beginning with the two-byte code E100 hexadecimal and spanning to FFFF hexadecimal, giving a DBCS language module access to over 7,900 unique DBCS characters in this example. As such, in this embodiment, a character encoded in the data string area of the language data module having a character code of E0 hexadecimal indicates that the following byte is an extended ASCII character in the range E0-FF, and a character code of E1 hexadecimal or greater indicates that the current byte and next byte represent an encoded 16-bit value for a DBCS character.

In addition to including the text and graphical data used by the computer program to display information on the display terminal, the system of the present invention also includes font data for displaying the characters on the display terminal. As such, the computer program is not required to store the font data used to display the text and graphical data. As illustrated in FIG. 2, the system of the present invention includes a font data module 60. The font data module includes font data for the standard ASCII and extended ASCII characters. In addition to removing the font data from the computer program, the separation of the font data into an independent module is advantageous for several reasons. First, by maintaining the font data in a separate module, the font with which ASCII characters are displayed may be readily changed. This allows the text displayed on the display terminal to be customized for the user. Further, the system may include a plurality of font modules each having font data for displaying characters in a different font, thereby allowing the computer program to change the font used for displaying the data at will.

Secondly, and important to the data structure of the language data module, is that by maintaining the font data in a separate module, the language data module is not required to store the font data for standard ASCII characters. As such, if there is more than one language data module, such as in the case where there are different language modules for different languages, the font data for standard ASCII characters is located in one storage location, instead of each language data module. Thus, in this embodiment, the language data module need only include font data for the extended ASCII characters not already represented in the standard font data module and font data for DBCS characters.

Specifically, with reference to FIG. 4, in one embodiment, the language data module 66 of the present invention includes an extended ASCII font data area 76, (if the language contains extended ASCII characters not supported by the standard font data module), and a DBCS font data area 78, (if the language requires DBCS fonts), for storing font data for extended ASCII and DBCS characters.

With regard to maintaining font data for extended ASCII and DBCS characters, the system of the present invention may also minimize storage of the font data for DBCS characters. As discussed previously, there are a large number of possible DBCS characters, and each DBCS character has an associated large amount of font data. In light of this, it is typically advantageous to store only the font data associated with the DBCS characters that appear in the data strings in the language data module. For example, as discussed above, one encoding method of the present invention encodes the DBCS characters as two-byte character codes beginning with E100 hexadecimal in the string data area. In this encoding scheme, as each DBCS character is sequentially encoded, the font data associated with each DBCS character is sequentially stored in the DBCS font data area corresponding to the two-byte encoded value stored in the data string area. As such, when the DBCS character is to be displayed, the code is extracted from the data string area and E100 is subtracted from the encoded value. The remainder of this subtraction is then multiplied by the font pixel size of a DBCS character. The multiplied value, in turn, indicates the location offset of the DBCS font data for the character in the DBCS font data area.

Figure 5:
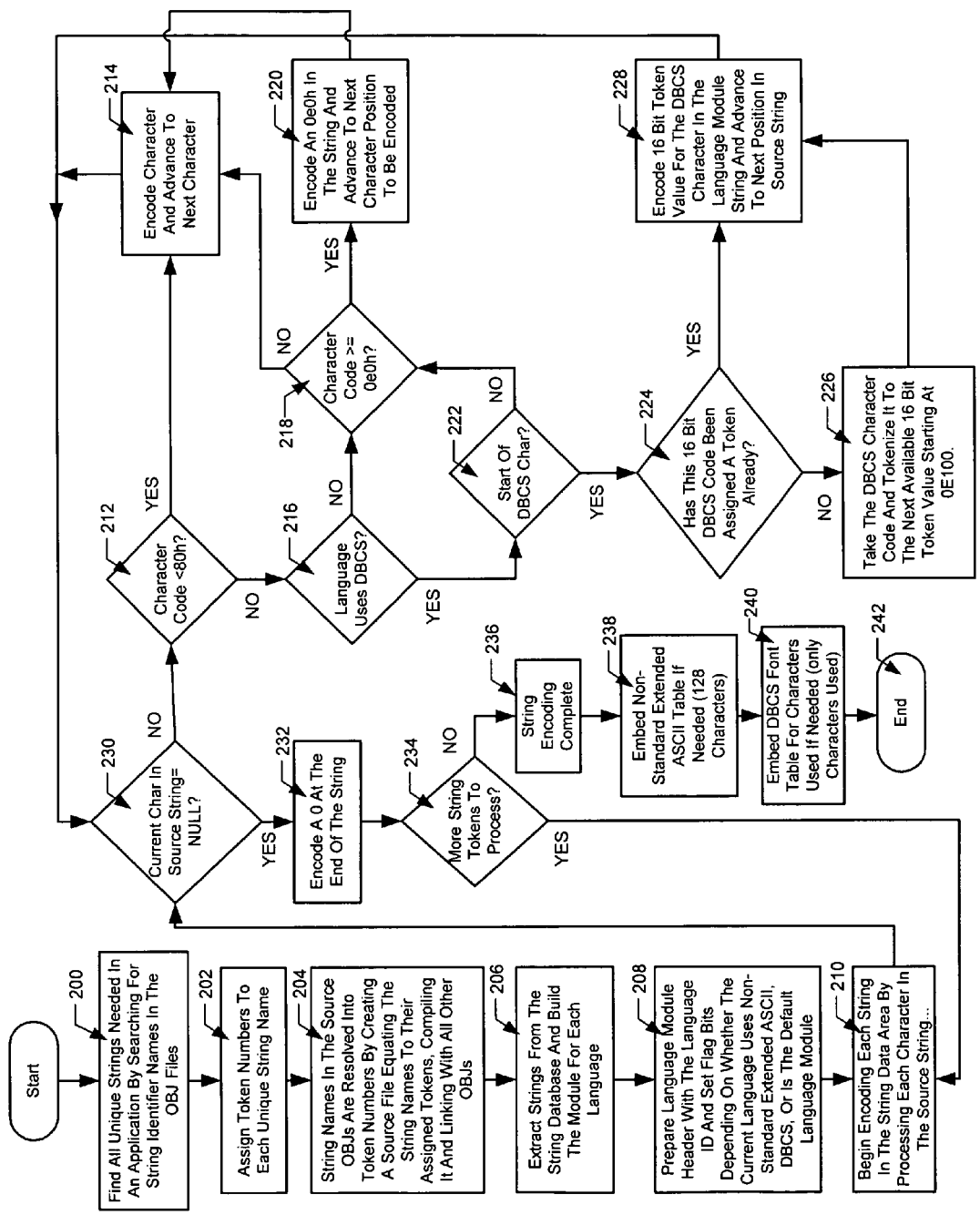
FIG. 5 is a block diagram of the operations performed to encode the data strings used by a computer program to display information on a display terminal according to one embodiment of the present invention.

With reference to FIG. 5, a method for encoding data strings into a data language module in accordance with the above-discussed embodiment is illustrated. Specifically, it is initially determined what different data strings are used by the computer program to display information to the user. (See step 200). These strings are typically stored in a large database by the developer of the program consisting of all available translations for the particular string. For example, BIOS may include a string search utility that searches for all strings in the BIOS object (OBJ) files.

After all the strings have been determined, a unique 16 bit identification number called a token is associated with each unique string. (See step 202). The string numbers used in the source OBJ files are resolved into token numbers by creating a source file equating the string numbers to their assigned tokens, compiling the source file, and linking the source file with all other OBJ files. (See step 204). Next, each string is extracted from the database in the desired language associated with the language module. (See step 206).

The language module header 70, (see FIG. 4), for the language data module 66 is configured with the language identification. Additionally, the flag bits are set depending on whether the current language uses non-standard extended ASCII and DBCS characters. Further, the default flag bit is set if the language module is the default language module. (See step 208). The strings are then encoded one at a time in the string data area 74 of the language data module 66. (See step 210). Specifically, for each character in a string, the character is checked to see if the character is a standard ASCII character, (i.e., <80 hexadecimal). (See step 212). If the character is <80 h, the character is encoded as-is in the string data area, and the system advances to next position in the source string. (See step 214).

However, if the character has an ASCII code ≧80 hexadecimal, the DBCSFlag located in the header of the module is checked to see if the language associated with the module uses DBCS characters. (See step 216). If the language does not use DBCS characters, (i.e., DBCSFlag=0), the character is then checked to determine if the character is greater than or equal to the escape code. (See step 218). If the character is in the range of 80 to DF hexadecimal, then the character is an extended ASCII character having an ASCII code that is less than the escape code. In this instance, the character is encoded as-is. (See step 214). However, if the character code is greater than or equal to the "escape code," (in this case E0 hexadecimal), then the escape code is added preceding the character value. Further, both the escape code and character value are stored in the string data area, and the system advances to the next position for processing. (See step 220).

This encoding method is necessary in order to encode single byte extended ASCII characters that are reserved for DBCS token values. In this example of the invention, DBCS codes are assigned values ranging from E100 to FFFF hexadecimal. To encode a single byte greater than or equal to the escape code E0 hexadecimal, the character must be preceded by the escape code. Then, during an actual string display operation, the display management module will know when it encounters the escape code to take the next single byte and use it to display a single ASCII character. Also, if the value to be encoded is E0, it must be preceded by the escape code E0 hexadecimal to indicate that it is a character to be displayed.

The escape code informs the display management module that the character following the escape code is a single byte extended ASCII character. For example, if a data string contains a degree symbol (ASCII code 0 F8 hexadecimal), the character will be encoded in the string data area as E0F8 hexadecimal. As such, the character is encoded from a one-byte into a two-byte character with the addition of the escape code.

If the language associated with the language module uses DBCS characters, (see step 222), the character is checked to see if it is a DBCS character. If so, the system determines whether this DBCS code has been previously encountered in a data string and tokenized. (See step 224). If this particular DBCS code has not been previously used, the DBCS character code is assigned to the next available 16 bit code and encoded into the string data area. (See step 226). For example, if the current character is the first DBCS character, then it is encoded as E100 hexadecimal. Similarly, if the current character is the third unique DBCS character to be encoded, it will be encoded as E102 hexadecimal. However, if this DBCS code has been previously encountered and encoded, the DBCS value is replaced with its previously assigned code value and encoded in the string data area, and the system advances to the next position in source string. (See step 228).

The encoding is continued until all characters of the string have been encoded. This is determined by checking whether the current character in the source string is null, as null indicates the end of the data string. (See step 230). If the character in the source string is null, a 0 is placed at the end of the encoded string to allow the display management module to know that the end of the string has been reached when being displayed. (See step 232). Further, the process is continued until all strings have been encoded into the language module. (See step 234 and 236). After all data strings have been encoded, and if the language requires it, (i.e., if ExtendedASCIIFlag=1), the non-standard extended ASCII font data for the language is stored in the extended ASCII font data area of the language module. (See step 238). Or, if the language includes DBCS characters, (i.e., if DBCSFlag=1), the DBCS font table for the DBCS characters found in the data strings are stored in the DBCS font data area of the language module and the building of the language module is completed. (See steps 240 and 242). As discussed above, the font data associated with each DBCS character is sequentially stored in the DBCS font data area corresponding the two-byte encoded value stored in the data string area and the size of the font data for a DBCS character.

Figure 6:
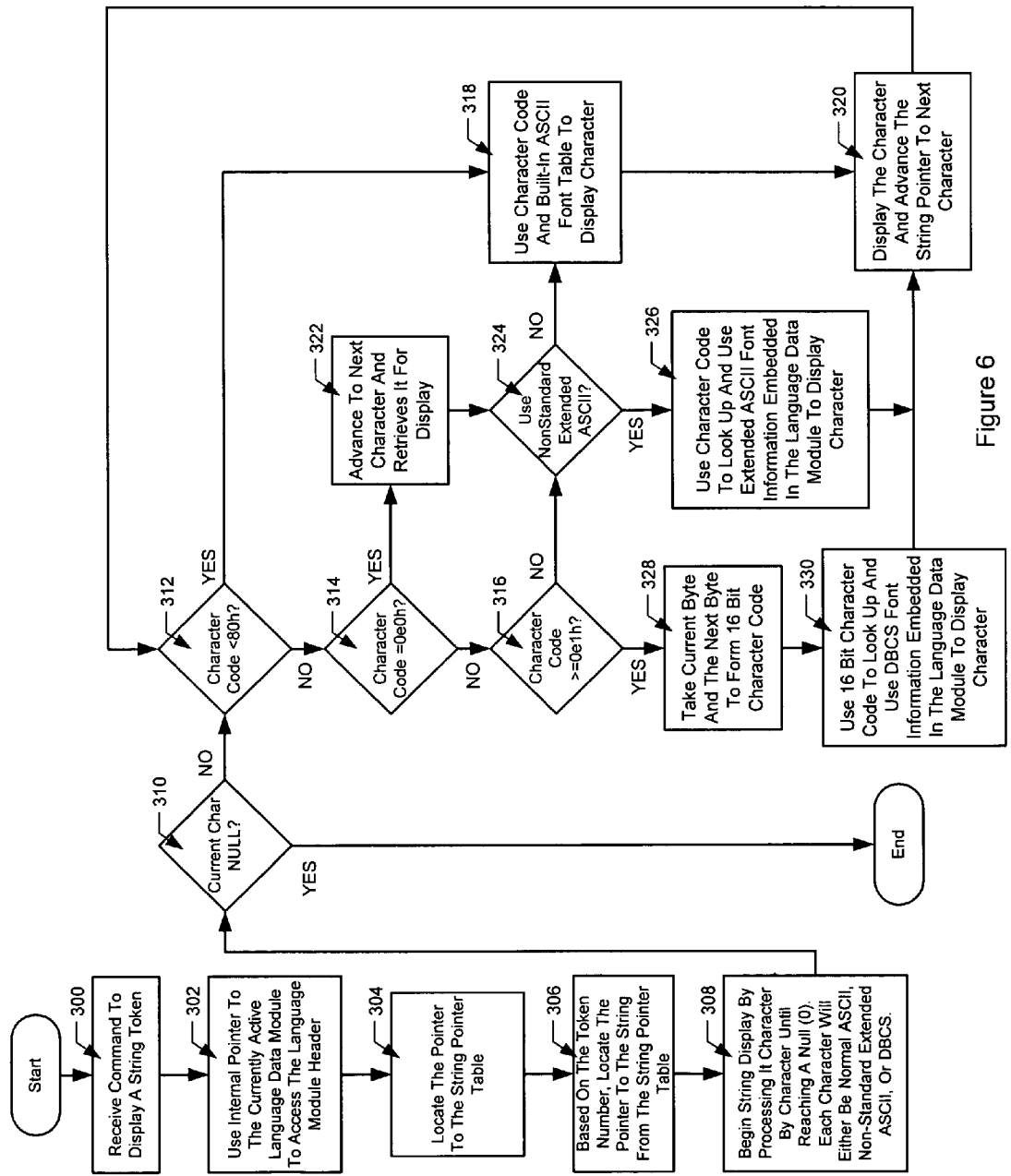
FIG. 6 is a block diagram of the operations performed to display information encoded in a language data module on a display terminal according to one embodiment of the present invention.

As illustrated in FIG. 2, the present invention provides a system for managing the information displayed by a computer program. With reference to FIG. 6, a method for displaying a data string requested by a computer program using a language data module that has been created using the encoding scheme discussed above is illustrated. Specifically, as the computer program operates, it will encounter source code for which the computer program is to display a data string to a display terminal. The source code of this embodiment does not include the data string, but instead includes identification number or token. The computer program outputs the token and a string display command to the input 56 of the display management module 54. (See step 300). The display management module uses an internal pointer to the current active language module 66 to access the language module header 70. (See step 302). From the header, the display management module locates the pointer indicating the storage address of the string pointer table 72. (See step 304). Based on the token from the computer program, the display management module locates the pointer from the string pointer table addressing the storage location of the string associated with the token. (See step 306).

After the string is located, the display management module processes the string character by character and displays each character until a null character is reached, indicating the end of the string. (See steps 308 and 310). For each character, the display management module checks to see if the character is a normal ASCII character (00 to 7 F hexadecimal, (see step 312),) or an extended ASCII character having an ASCII code less than the escape code, (i.e., 80-DF hexadecimal, (see step 316)), or an extended ASCII character having a value equal to or greater than the escape code, (i.e., E0-FF hexadecimal), (see step 314), or a 16 bit DBCS character (E100-FFFF hexadecimal). (See step 316).

If the character is a normal ASCII character, (i.e., less than 80 hexadecimal), the display management module uses the character code stored in the data string and the standard ASCII font module to display the character and increments to the next character. (See steps 318 and 320).

If the character is an extended ASCII character having an ASCII code value less than the escape code, (i.e., greater than 80, and less than E0), (see step 316), the display management module first determines whether language module includes nonstandard extended ASCII characters based on whether flag ExtendedASCIIFlag is set to 1 in the language module header, (see Table 3). (See step 324). If the language module uses its own set of extended ASCII characters, the display management module uses the character code stored in the data string to look up and use the extended ASCII information stored in the extended ASCII font data area 76 to display the character. (See step 326). If the language module does not require a special set of extended ASCII characters, the display management module uses the character code and standard font table to display the character. (See step 318).

If the character is equal to the escape code, (i.e., in this case =E0 hexadecimal), it will consist of two bytes; one byte equaling the escape code E0 hexadecimal and a second byte including the character. If the first byte equals the escape code, (see step 316), the display management module advances to the next byte that includes the character value. (See step 322). The display management module next determines whether the language module includes nonstandard extended ASCII characters based on whether flag ExtendedASCIIFlag is set to 1 in the language module header, (see Table 3). (See step 324). If the language module uses its own set of extended ASCII characters, the display management module uses the character code stored in the data string to look up and use the extended ASCII information stored in the extended ASCII font data area 76 to display the character. (See step 326). If the language module does not require a special set of extended ASCII characters, the display management module uses the character code and standard font table to display the character. (See step 318).

If the character is in the range of E1-FF hexadecimal, it signals the start of a DBCS character (E100-FFFF hexadecimal), (see step 316), and will consist of two bytes that form a 16-bit character code. (See step 328). To locate the font data for a particular DBCS character, the display management module subtracts E100 hexadecimal from the 16-bit character code. Additionally, the display management module multiplies the subtracted value by the font pixel size in bytes of a double byte character. The multiplied value corresponds to the location offset of the DBCS font information stored in the DBCS font data area 78 for the DBCS character. (See step 330). The process is continued until all characters in the data string have been displayed.

In addition to minimizing storage space and making the text and graphic data used by the computer program accessible for updating or alteration, the present invention also provides a system for displaying text in different languages. In this embodiment, the system includes a plurality of language data modules, each containing the language data displayed by the computer program translated into a different language. For each language data module, the corresponding data strings are associated with the same token number. In this embodiment, the language in which the data string associated with the token is displayed is controlled by choosing which language data module to extract the data string associated with the token.

Figure 7:
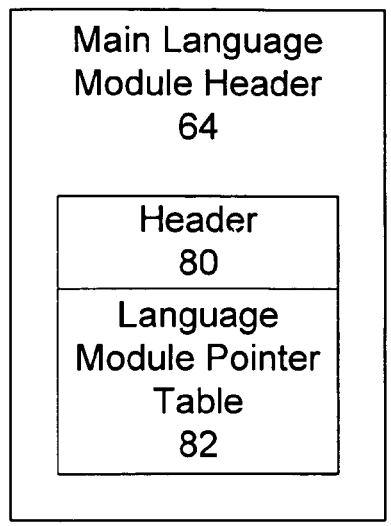
FIG. 7 is a block diagram of the data structure of main language data module header that includes string pointers to the location of various language data modules stored in memory according to one embodiment of the present invention.

Specifically, with reference to FIG. 2, in this embodiment of the present invention, the system includes a plurality of language data modules 66, where each module includes the data strings stored in a selected language and a main language module header 64 to assist in locating which language to display the information from the computer program. FIG. 7 illustrates the main language module header. Specifically, the main language module header 64 serves to provide the display management module 54 with pointers to each of the different language modules that may be present. As illustrated, the main language module header 64 includes a header 80 and a language module pointer table 82. The header 80 includes information related to a signature identifying the header as the main language module header, the identification of the default language, (such as English), pointer to the location of the language module pointer table 82 in memory, and the total number of languages present. The header is illustrated below in Table 3 according to one embodiment of the present invention.

TABLE 3

Header

| Offset | Size | Definition |
| --- | --- | --- |
| 0000h | DWORD | signature to identify presence of header |
| 0004h | WORD | 2 letter country code of default language module |
| 0006h | WORD | 16 bit offset to language module pointer table (from offset 0000h of the main header) |
| 0008h | WORD | number of languages present |

The language module pointer table 82 is typically organized such that each of the language modules are represented by a 2 letter country code and a 32 bit pointer to the header of the language module as illustrated in Table 4.

TABLE 4

Language Module Pointer Table

| Offset | Size | Definition |
| --- | --- | --- |
| 0000h | WORD | 2 letter country code |
| 0002h | DWORD | 32 bit language module pointer |
| 0006h | WORD | 2 letter country code |
| 0008h | DWORD | 32 bit language module pointer |
| (n*6) | WORD | 2 letter country code |
| (n*6) + 2 | DWORD | 32 bit language module pointer |

Figure 8:
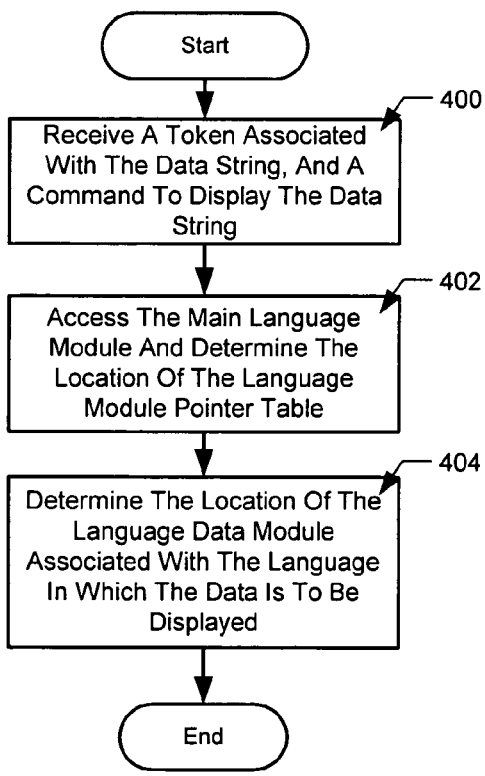
FIG. 8 is a block diagram of the operations performed to determine the location of a language data module stored in a computer-readable medium using a country code associated with the language data module and a main language module header according to one embodiment of the present invention.

With reference to FIG. 8, in this embodiment of the present invention, to display a data string in a specific language, the computer program provides a token associated with the data string and a command to display the data string. (See step 400). The language with which the data string is to be displayed is previously selected by a country code or preselected language code value corresponding to the language. Using the country code, the display management module accesses the main language module header 80 and determines the location of the language module pointer table 82. (See step 402). From the language module pointer table, the display management module determines the location of the language data module associated with the currently active country code. (See step 404). The display management module then proceeds to display the characters of the data string in the preselected language as discussed in the method of FIG. 6.

As discussed, the system includes a font module. The font module contains bitmapped font information for displaying the standard ASCII character set on the screen of a display. However, it must be understood that any font typestyle could be stored in the font module to display the data strings output by the computer program. For example, the module may include a script font for displaying the data strings. Additionally, the user may remap certain characters typically located in the extended ASCII set, (i.e., codes ≧80 hex), for special purposes, such as ®, ©, or ™. These characters could then be displayed using the remapped ASCII values. Additionally, because the font module is a separate module from the source code of the computer program, the display management module could be configured to use different font modules for different operations of the computer program. For example, in the case of BIOS, one font could be used for the display of text during POST (power on self-test) and a separate module for the display of text during the BIOS setup program.

In addition to the display of characters in different languages and fonts, the systems, methods, and computer program products of the present invention may also be used for other display functions such as to display logos, cursor positioning, text block functions, progress bar display, and scrolling. For example, with reference to FIG. 2, the system 52 of the present invention includes a logo module 62, which may contain one or many logos each with their own color palette. In a typical embodiment, each logo uses 16 of the available 256 colors, and the logos may have a transparent background for superimposing on other images. Each logo includes a header containing a pointer to the logo data and a number representing the palette set to use with the logo and any display attributes. Since each logo can use a maximum of 16 colors, there are 15 available blocks of 16 colors in the palette registers for the logo to use, (the first 16 colors is typically reserved for screen text). The structure of the logo module allows multiple logos to be displayed simultaneously, such that the colors do not corrupt the colors of each of the other logos.

With reference to FIG. 3, similar to the display of text data, in this embodiment of the present invention, to display a logo, the computer program outputs a command to display a logo and a pointer to the start of the logo module. (See step 100). Based on the command, the display management module accesses the logo module and retrieves the logo data. (See step 102). The display management module then using the data stored in the logo module and the associated color palette displays the logo on the display terminal. (See step 104).

Advantageously, in some embodiments, the logo module includes a plurality of logos all stored with their own color palette. In this embodiment, the display management module may display either one of the logos or multiple logos on the display terminal at the same time.

As indicated, in addition to displaying logos, in one embodiment, the systems, methods, and computer program products of the present invention also display progress bars. The display management module may be used to display at least two different types of conventional progress bars: gradient and filled bars. The gradient type progress bar fills a rectangular area with a calculated color gradient from a first color to a second color and then back to the first color. When the progress bar is updated, the palette colors occupied by the progress bar are shifted by one, thereby giving a rotating color effect. The filled bar type, on the other hand, begins as a hollow rectangle on the screen with a filled portion of the rectangular area representing a percentage of progress. To display this progress bar, the display management module receives from the program a command a command to display the progress bar and a value representing the percentage of the progress bar to be filled.

The display management module may also display boxes having either single or double line borders and possibly a shadow along one side. The characters for displaying the box are typically ASCII line drawing characters, and the shadow is displayed by changing the color attribute of the underlying characters.

Further, the display management module may also provides scrollable display areas defined within the display terminal, such that all images outside the boundaries of the display area are preserved during text writes, screen refresh, and scrolling. Additionally, the display management module may either enable or disable scrolling when character writes are made to the bottom right corner of the text window.

As discussed in the various embodiments above, the system of the present invention displays both text and graphical data on the display terminal. However, in some instances, the display terminal connected to the system of the present invention may not support a graphical display mode. In these instances, the display management module will sense that the display terminal does not operate in a graphics mode and will display only text characters on the display terminal.

In addition to providing systems, methods, and computer program products for displaying information from a computer program, the present invention also provides systems, methods, and computer program products for redirecting the output of the computer program to a different display. Specifically, the systems, methods, and computer program products of the present invention provides a method by which all text on a host system may be redirected and displayed at a remote location and representations of graphical images on a host system may be redirected and displayed at a remote location. Importantly, the display management module of the present invention provides commands and data to an external output redirection handler module, that when properly interpreted and transmitted, allow for the transmission of display information from the computer program to the remote display.

Figure 9:
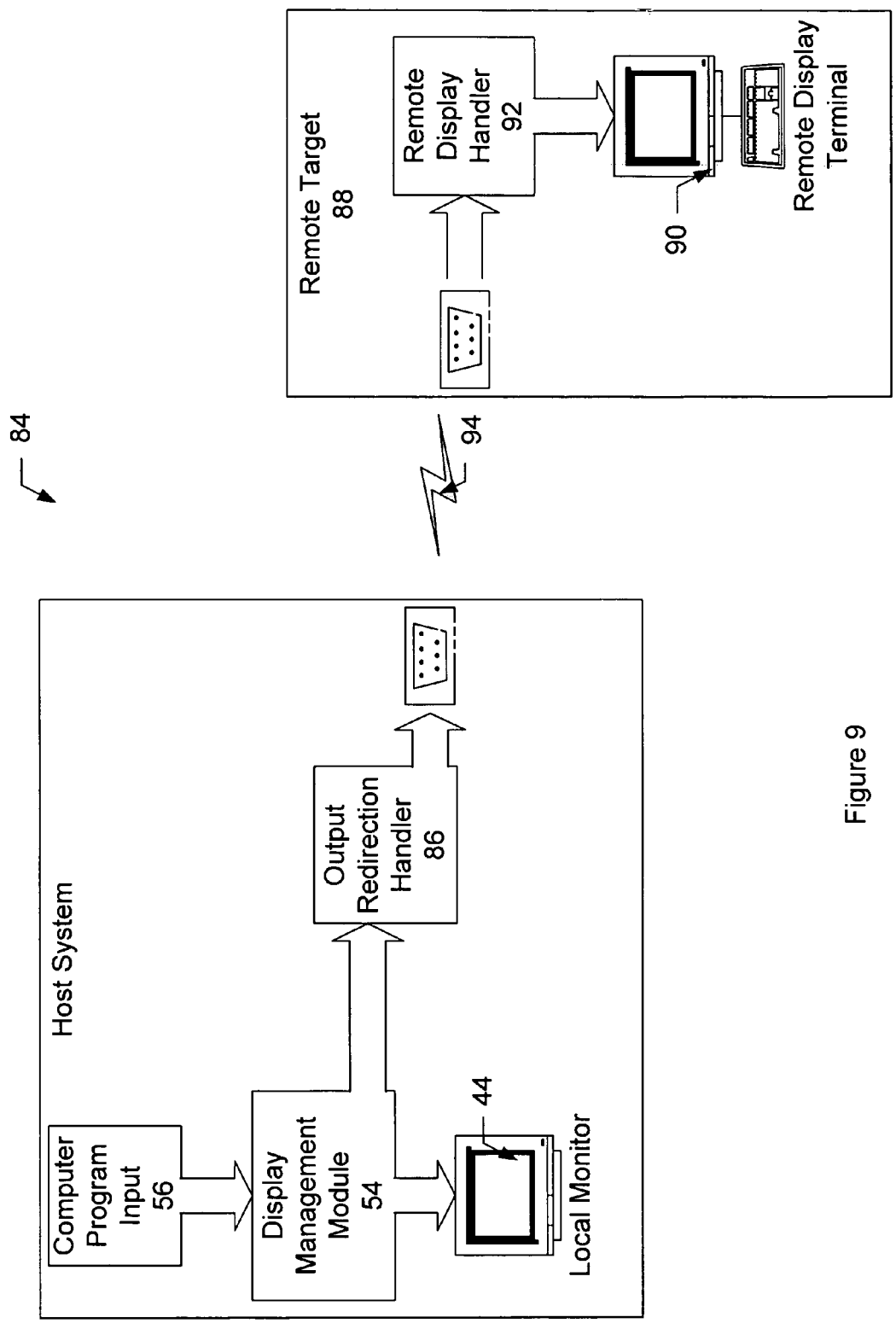
FIG. 9 is a block diagram of an apparatus for redirecting the display of information output by a computer program on a remote display terminal according to one embodiment of the present invention.

With reference to FIG. 9, a system 84 according to one embodiment of the present invention for redirecting the display of information from a computer program is illustrated. The system includes a display management module 54, having an entry point input 56 for receiving and transmitting information from a computer program. The system also includes an output redirection handler 86 stored in computer-readable medium and connected to the display management module. Located remote from the system is a target system 88 having a remote display terminal 90 and a remote display handler 92 stored in a computer-readable medium. The system and target system are connected by a data communication link 94 allowing the transmission of data, such as a serial, parallel, or network link.

Importantly, the display management module 54 of this embodiment provides commands to the output redirection handler to describe what is being drawn on the screen. As illustrated, the data communication link between the system and target system can take many forms. Further, the data may be transmitted in several different forms, such as network packets, dumb-terminal protocols, etc. In order to make the display management module generic and independent of the form of communication, the display management module, according to one embodiment of the present invention, does not include the code for the hardware-related functions for transmitting the display data across the communication link. Instead, the transmission of the data across the communication link is performed by the output redirection handler module, which is designed to transmit the data across the communication link. This, in turn, allows the display management module to remain generic for all remote display applications, such that the display module does not have to be modified. By placing the responsibility for the actual transmission of data on the output redirection handler, many different types of modules may be written and used interchangeably with the display management module.

In addition, the display management module also uses a command/data set that has been chosen and defined to provide remote display that accurately reflects the display of the information on the local display associated with the system. The chosen command/data set also minimizes the amount of data transmitted to the target system, thereby optimizing the speed of the display.

With reference to FIG. 9, the command/data is transmitted across the communication link to a remote display handler 92 connected to the remote display terminal 90. The remote display handler is either a specifically written module to properly receive and display the command/data from the output redirection handler or is an existing module or program, (such as a terminal emulator), if the data has been encoded in a suitable format by the output redirection handler to operate with the remote display handler.

Figure 10:
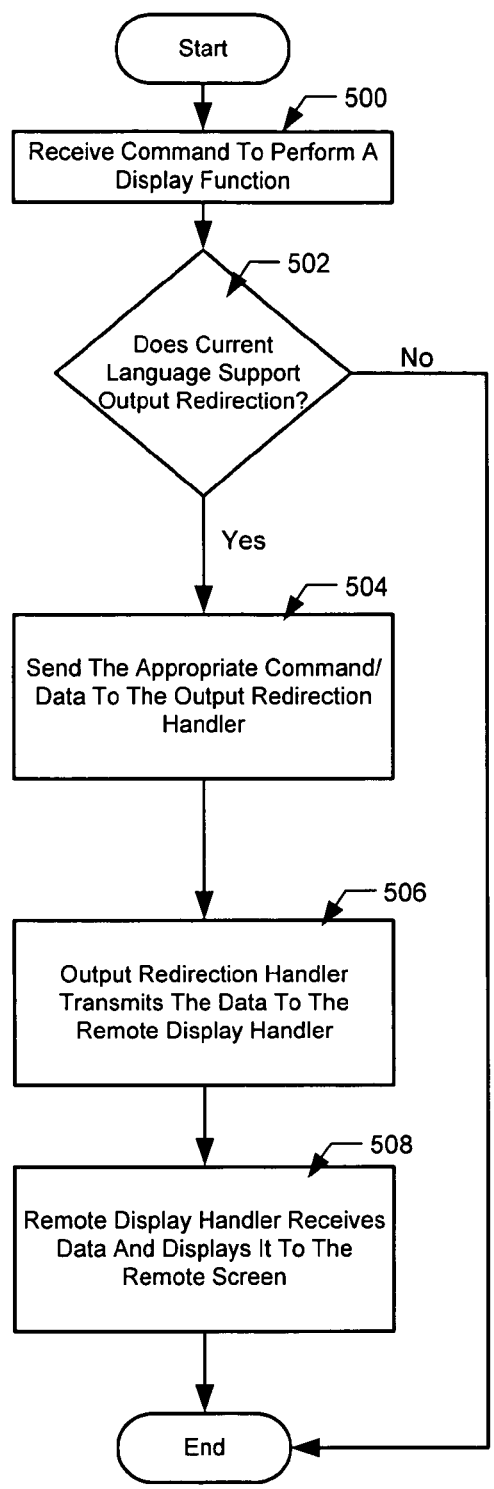
FIG. 10 is a block diagram of the operations performed to redirect the display of information output by a computer program on a remote display terminal according to one embodiment of the present invention.

With reference to FIG. 10, the operation for displaying command/data at a remote location according to one embodiment of the present invention is illustrated. To initiate output redirection, (when activated), the computer application sends a display command, (textual or graphical), to the display management module. (See step 500). The display management module determines whether the currently designated language supports output redirection. (See step 502). If so, the display management module transmits the command/data to the output redirection handler. (See step 504). The output redirection handler, in turn, formats and transmits the command/data for transmission across the data communication link. (See step 506). The remote display handler receives the command/data and displays the data on the remote terminal. (See step 508).

The display management module provides flexibility for changes in the remote terminal. If the requirements for either the remote terminal or communication link are altered, the output redirection handler and remote display handler can be altered to meet these new needs, while the display management module will remain the same.

As discussed previously, the systems, methods, and computer program products of the present invention use a command/data set that has been chosen and defined to provide remote display that accurately reflects the display of the information on the local display associated with the system and minimizes the amount of data transmitted to the target system, thereby optimizing the speed of the display. In order to display accurately the output from the computer program, the output redirection handler must accurately interpret the display management module command set as received from the display management module. Then, after the output redirection handler has properly interpreted the commands from the display management module, the output redirection handler may transmit data and/or commands to the remote display handler in any desired manner.

If on the other hand, the output redirection handler merely transmits the command/data from the display management module to the remote display handler without alteration, then the remote display handler should be designed to: 1) receive data via the required transmission method and 2) interpret the commands and the data to output the information to the remote display terminal. As such, the remote display handler associated with the target system should be programmed to perform the necessary tasks as requested by the command and data from the display management module.

As detailed above, the display management module outputs commands and data to the output redirection handler for display on the remote display terminal. As time is required to transmit data from the output redirection handler to the remote display terminal, including time to convert the data for transmission across the data communication link, it may be advantageous to reduce the amount of data transmitted. For example, there are certain attributes associated with the display on the display terminal. For data updates to the display that do not alter the attributes associated with the display, it may be advantageous to forego resending the attribute with the data. As such, in one embodiment, the remote display handler stores a current attribute value representing the color attribute of the characters being displayed on the remote display terminal. Thus, subsequent commands to display data on the remote display terminal that do not alter the attribute of the display do not require transmittal of the attribute variable.

Similarly, in some instances, characters are displayed consecutively in a row on the remote display terminal. Since the characters are displayed consecutively, it may be advantageous to store the current cursor position at the remote display terminal, such that consecutive characters sent for display do not require the sending of the cursor position for displaying the character. As such, in one embodiment, the remote display handler stores a value representing the current position of a cursor on the remote display terminal such that subsequent commands to display data on the remote display terminal do not require data concerning cursor position.

In addition to providing systems and methods, the present invention also provides computer program products for managing the display of information from a computer program on a display terminal. Further, the present invention provides computer program products for creating a language module to store data strings used by a display management module to display information on a display terminal and computer program products for redirecting the display of information from a computer program to a remote display terminal. With reference to FIG. 2, the computer readable storage medium may be part of the ROM 22 or RAM 20, and the processor 14 of the present invention may implement the computer readable program code means as discussed in the various embodiments above.

In one embodiment, the present invention provides computer program products for managing the display of information from a computer program on a display terminal. In this embodiment of the present invention, the computer-readable medium includes first computer instruction means for providing on a computer-readable medium data modules containing text and graphical data used by the computer program to display information on the display terminal. In this embodiment, tokens are associated with the data strings located in the data modules. The computer-readable medium also includes second computer instruction means for receiving a string display command and a token output by the computer program to display data associated with the token on the display terminal. Further, the computer-readable medium includes a third computer instruction means for retrieving the data associated with the token from the data modules, and fourth computer instruction mean for displaying the data associated with the tokens on the display terminal. Importantly, in this embodiment, storage of the text and graphical data in the data modules eliminates the requirement that the text and graphical data for displaying information on the display terminal be contained in the computer program.

In another embodiment, the present invention provides computer program products for creating a language module to store data strings used by a display management module to display information on a display terminal. In this embodiment of the present invention, the computer-readable medium includes first computer instruction means for analyzing each character of each data string, where each character is a character selected from the group consisting of standard ASCII, extended ASCII, and double byte character. The computer-readable medium of the present invention further includes second computer instruction means for encoding characters in the data strings that are extended ASCII and double byte characters and third computer instruction means for creating a string data area in a range of memory addresses in the computer-readable medium. Further, the computer-readable medium further includes fourth computer instruction means for storing the data strings in the string data area. In this embodiment, the fourth computer instruction means stores characters that are standard ASCII characters and extended ASCII characters having ASCII codes less than E0 hexadecimal in the string data area by their ASCII representations. Further, the fourth computer instruction means stores extended ASCII characters that are greater than or equal to E0 hexadecimal as a two-byte code with the ASCII character preceded by the escape code E0 hexadecimal and DBCS characters in the string data area by two-byte codes sequentially encoded from E100 to FFFF hexadecimal.

In still another embodiment, the present invention provides computer program products for redirecting the display of information from a computer program to a remote display terminal. In this embodiment, the computer program product includes a computer-readable medium having first computer instruction means for providing on a computer-readable medium data modules containing text and graphical data used by the computer program to display information on the remote display terminal. The computer-readable medium further includes second computer instruction means for receiving a command to display text and graphical data from the computer program and third computer instruction means for retrieving data associated with the command from the data modules. To display the information on a remote display terminal, the computer-readable medium further includes fourth computer instruction means for outputting commands and text and graphical data from the data modules for display and fifth computer instruction means for redirecting the commands and text and graphical data representations to the remote display terminal, where a sixth computer instruction means displays the text and graphical data representations on the remote display terminal.

In this regard, FIGS. 2–10 are block diagrams, flowcharts and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for redirecting to a remote display terminal information output by a computer program directed to a first display terminal such that the information can also be displayed at the remote display terminal comprising:

a computer program that contains at least one token stored therein representing one of text data and graphical data to be displayed during operation of said computer program;

a display management module stored on a computer-readable medium in communication with an output of the computer program and the remote display terminal for displaying data output from the computer program directed to the first display terminal to the remote display terminal;

data modules stored on a computer-readable medium containing text data and graphical data representations used by the computer program to display information on a display terminal, wherein at least one of said text data and graphical data representations corresponds to the token stored in said computer program;

an output redirection handler stored on a computer-readable medium in communication with said display management module;

a data communication link connected between said output redirection handler and the remote display terminal; and a remote display handler stored on a computer-readable medium in communication with the data communication link and the remote display terminal, wherein said display management module receives commands to display data from the computer program, and wherein said display management module, based on the commands from the computer program, provides commands and data from said data modules to said output redirection handler, wherein said output redirection handler receives the information from said display management module and provides the information to the remote display terminal for display, wherein to display text or graphical data, said computer program outputs a token representing the text or graphical data to be displayed, and said display management module uses the token to retrieve the text or graphical data from said data modules for display on the remote display terminal, and wherein said remote display handler stores a current attribute value representing a color attribute of the characters being displayed on the remote display terminal such that subsequent commands to display data on the remote display terminal that do not alter the attribute do not require transmittal of the attribute variable.

2. A system according to claim 1, wherein said display management module provides data and commands based on a predetermined set of commands, and wherein said output redirection handler communicates with said display management module using the predetermined set of commands and provides the commands and data to the remote display handler for display on the remote display terminal.

3. A system according to claim 1, wherein said data communication link is a data communication link selected from the group consisting of parallel, serial, and network, and wherein said output redirection handler receives commands and data from said display management module and formats the commands and data for transmission across said data communication link.

4. A system according to claim 1, wherein said remote display handler receives commands and data from said output redirection handler and controls the remote display terminal to display the data.

5. A system according to claim 1, wherein at least one data module is a language data module including data strings representing language data, wherein each data string is stored in said data modules and designated by a token, and wherein to display a data string, said display management module receives a token associated with the data string from the computer program and a command to display the data string and based on the token accesses said language data module, retrieves the data string associated with the token, and outputs the data string and a command to display the data string to said output redirection handler.

6. A system according to claim 1 further comprising:
a plurality of language data modules associated with said display management module, wherein each language data module includes data strings representing language data in a selected language; and
a main language module header stored on a computer-readable medium and associated with said display management module comprising individual pointers indicating the location in a computer-readable storage medium in which each language data module is located, wherein to display a data string in a selected language, said display management module receives a token associated with the data string and a command to display the data string, wherein said display management module accesses said main language module header and retrieves the pointer associated with the language data module corresponding to a preselected desired language for displaying the data string, and wherein said display management module using the pointer, accesses the language data module, retrieves the data string associated with the token, and outputs the data string in the desired language and a command to display the data string to said output redirection handler.

7. A system according to claim 5 further comprising a font module stored on a computer-readable medium containing font data for displaying 256 standard and extended ASCII characters.

8. A system according to claim 7, wherein at least one data module is a language data module comprising:
a string data area stored on a computer-readable medium that includes data strings representing language data, wherein each character of each data string is a character selected from the group consisting of standard ASCII, extended ASCII, and double byte characters;
an extended ASCII font data area stored on a computer-readable medium for storing font data related to extended ASCII characters that are not displayable using the extended ASCII character font data stored in said font module; and
a double byte character font data area stored on a computer-readable medium for storing font data related to at least one double byte character.

9. A system according to claim 8, wherein characters in a data string that are standard ASCII and extended ASCII characters having ASCII codes less than a selected escape code are stored by their ASCII representations in said string data area, while extended ASCII characters and standard ASCII characters, if any, having ASCII codes at least as great as the selected escape code and ASCII characters that identify double byte characters are encoded and the encoded values are stored in said string data area.

10. A system according to claim 8, wherein standard ASCII characters and extended ASCII characters having ASCII codes less than the selected escape code are stored by their ASCII code representations in the string data area, and wherein extended ASCII characters having ASCII codes at least as great as the selected escape code and ASCII characters that identify the start of 16 bit double byte characters are encoded into 16 bit values and the encoded values are stored in the string data area.

11. A system according to claim 10, wherein double byte characters are sequentially encoded and the 16 bit encoded values representing the double byte characters are stored in said string data area, wherein font data associated with the double byte characters is stored in the double byte character font data area, and wherein at least one extended ASCII character is encoded in said string data area with an escape code preceding the ASCII representation of the extended ASCII character, and wherein if the extended ASCII character is not displayable with extended ASCII character font data stored in said font module, data for the extended ASCII character is stored in said extended ASCII font data area.

12. A system according to claim 11, wherein double byte characters are sequentially encoded such that the first double byte character is represented by a two-byte code having a first byte that is one value greater than the escape code and a second byte equal to zero, and wherein remaining unique double byte characters are encoded with sequential 16 bit code values.

13. A system according to claim 12, wherein to display a data string, said display management module receives a token associated with the data string and a command to display the data string from the computer program and accesses the location in the string data area where the data string is located and sequentially outputs the characters of the data string along with a command to display the data string to said output redirection handler.

14. A system according to claim 7, wherein when said display management module receives a command to display an ASCII character, said display management module locates the font data associated with the ASCII character in said font module and using the font data outputs the ASCII character to a local display and a command and the character code to said output redirection handler.

15. A system according to claim 1 further comprising a logo module stored in a computer-readable medium and associated with said display management module, wherein said logo module contains graphical data for display of at least one logo, and wherein when said display management module receives a command to display the logo, said display management module locates the graphical data associated with the logo in said logo module and outputs the logo image to a local display and a command and data necessary to display a representation of the logo to the output redirection handler.

16. A system according to claim 1 wherein said display management module outputs data for displaying a progress bar and a command to display a representation of the progress bar to said output redirection handler.

17. A system according to claim 1, wherein said display management module outputs data for displaying a box defining an area on a display terminal and a command to display the box to said output redirection handler.

18. A system according to claim 17, wherein said display management module outputs data for displaying a box defining an area on a display terminal, wherein said display management module further outputs data to be displayed within the defined area of the box, and wherein said display management module outputs commands to scroll the data displayed within the defined area, while any data displayed on other portions of the remote display terminal remain at the same position.

19. A method for redirecting to a remote display terminal information output by a computer program directed to a first display terminal such that the information can also be displayed at the remote display terminal comprising the steps of:
providing a computer program that contains at least one token stored therein representing one of text data and graphical data to be displayed during operation of said computer program;
providing on a computer-readable medium data modules containing text and graphical representation data used by the computer program to display information, wherein at least one of said text data and graphical data representations corresponds to the token stored in said computer program;
receiving a command to display data from the computer program;
retrieving data associated with the command from the data modules;
providing a command and data from the data modules for display;
redirecting the command and data to be displayed to the remote display terminal an using an output redirection handler stored on a computer-readable medium;
displaying the data on the remote display terminal; and
storing a current attribute value representing a color attribute of the characters being displayed on the remote display terminal such that subsequent commands to display data on the remote display terminal from said providing a command and data step that do not alter the attribute do not require output of the attribute variable,
wherein to display text or graphical data, said computer program outputs a token representing the text or graphical data to be displayed, and said retrieving step uses the token to retrieve the text or graphical data from said data modules for display on the remote display terminal.

20. A method according to claim 19, wherein said providing a command and data step provides data based on a predetermined set of commands, and wherein said redirecting step, using the predetermined set of commands, redirects the data to the remote display terminal.

21. A method according to claim 20 further comprising the step of transmitting the command and data from said redirecting step on a data communication link to the remote display terminal.

22. A method according to claim 21, wherein the data communication link is a data communication link selected from the group consisting of parallel, serial, and network, and wherein said transmitting step further comprises the step of formatting the commands and data from said providing commands and data step for transmission across the data communication link.

23. A method according to claim 19 further comprising the step of storing a value representing the current position of a cursor on the remote display terminal such that subsequent commands to display data on the remote display terminal from said providing a command and data step do not require data concerning cursor position.

24. A method according to claim 19, wherein said providing data modules step provides at least one data module that is a language data module including data strings representing language data, wherein each data string is stored in the language data modules and designated by a token, and wherein to display a data string on the remote terminal display, said receiving step receives a token associated with the data string and a command to display the data string from the computer program and based on the token said retrieving step accesses the data modules and retrieves the data string associated with the token, and wherein said providing a command and data step provides the data string and a command to display the data string.

25. A method according to claim 19, wherein said providing data modules step provides a plurality of language data modules on a computer-readable medium, wherein each language data module includes data strings representing language data in a selected language, and wherein said providing data modules step further provides a main language module header on a computer-readable medium comprising individual pointers indicating the location in a computer-readable storage medium in which each language data module is located, wherein to display a data string in a selected language, said receiving step receives a token associated with the data string and a command to display the data string from the computer program, wherein said retrieving step accesses the main language module header and retrieves the pointer associated with the language data module corresponding to a preselected desired language for displaying the data string, wherein said retrieving step using the pointer, accesses the language data module and retrieves the data string associated with the token, and wherein said providing a command and data step provides the data string for display on the remote display terminal.

26. A method according to claim 24, wherein said providing step further provides a font module stored on a computer-readable medium containing font data for displaying 256 standard and extended ASCII characters.

27. A method according to claim 26, wherein said providing data modules step provides at least one data module that is a language data module, wherein said providing data modules step provides:
- a string data area stored on a computer-readable medium that includes data strings representing language data, wherein each character of each data string is a character selected from the group consisting of standard ASCII, extended ASCII, and double byte characters;
- an extended ASCII font data area stored on a computer-readable medium for storing font data related to extended ASCII characters that are not displayable using the extended ASCII character font data stored in the font module; and
- a double byte character font data area stored on a computer-readable medium for storing font data related to characters that are double byte characters.

28. A method according to claim 27, wherein said providing step provides a string data area wherein characters in a data string that are extended ASCII characters and standard ASCII characters, if any, having ASCII codes less than a selected escape code are stored by their ASCII representations in the string data area, while extended ASCII characters and standard ASCII, if any, having ASCII codes at least as great as the selected escape code and ASCII characters that identify the start of 16 bit double byte characters are encoded into 16 bit values and the encoded values are stored in the string data area.

29. A method according to claim 27, wherein said providing step provides a string data area wherein characters in a data string that are standard ASCII characters and extended ASCII characters having ASCII codes less than a selected escape code are stored by their ASCII representations in the string data area, while extended ASCII characters having ASCII codes at least as great as the selected escape code and ASCII characters that identify the start of 16 bit double byte characters are encoded into 16 bit values and the encoded values are stored in the string data area.

30. A method according to claim 29, wherein said providing step provides a string data area including double byte characters that are sequentially encoded and the encoded values representing the double byte characters are stored in the string data area, wherein font data associated with the double byte characters is stored in the double byte character font data area, and wherein at least one extended ASCII character is encoded as a 16 bit value in the string data area with an escape code preceding the ASCII representation of the extended ASCII character, and wherein if the extended ASCII character is not displayable with the extended ASCII character font data stored in the font module, data for the extended ASCII character is stored in the extended ASCII font data area.

31. A method according to claim 30, wherein said providing step provides a string data area including double byte characters that are sequentially encoded such that the first double byte character is represented by a two-byte code having a first byte that is one value greater than the escape code and a second byte equal to zero, and wherein remaining unique double byte characters are encoded with sequential 16 bit code values.

32. A method according to claim 30, wherein to display a data string on a remote display terminal, said receiving step receives the token associated with the data string and a command to display the data string from the computer program and said retrieving step accesses the location in the string data area where the data string is located, and wherein said providing a command and data step sequentially outputs the characters of the data string along with a command to display the data string to the output redirection handler.

33. A method according to claim 26, wherein to display an ASCII character, said retrieving step locates the font data associated with the ASCII character in the font module, and wherein said providing a command and data step, using the font data, outputs the ASCII character to a local display and a command and the character code to display the character to the output redirection handler.

34. A method according to claim 19, wherein said providing data modules step further provides a logo module stored on a computer-readable medium, wherein the logo module contains graphical data for display of at least one logo, wherein when said receiving step receives a command to display the logo, said retrieving step locates the graphical data associated with the logo in the logo module, and wherein said providing a command and data step, using the logo data, provides the logo image to the local display and a command to display a representation of the logo to the output redirection handler.

35. A method according to claim 19, wherein said providing a command and data step provides data for displaying a progress bar and a command to display the progress bar representation to the output redirection handler.

36. A method according to claim 19, wherein said providing a command and data step provides data for displaying a box defining an area on a display terminal and a command to display the box to the output redirection handler.

37. A method according to claim 36, wherein said providing a command and data step provides data for displaying a box defining an area on a display terminal and data to be displayed within the defined area of the box, and wherein said providing a command and data step provides a command to scroll the data displayed within the defined area, while any data displayed on other portions of the remote display terminal remain at the same position.

38. A computer program product for redirecting to a remote display terminal information output by a computer program directed to a first display terminal such that the information can also be displayed at the remote display terminal, wherein the computer program product comprises:
- a computer-readable storage medium having computer readable program code means embodied in said medium, said computer-readable program code means comprising:
  - computer program that contains at least one token stored therein representing one of text data and graphical data to be displayed during operation of said computer program;
  - first computer instruction means for providing on a computer-readable medium data modules containing text and graphical data used by the computer program to display text information and a representation of graphical images on the remote display terminal, wherein at least one of said text data and graphical data representations corresponds to the token stored in said computer program;
  - second computer instruction means for receiving a command to display data from the computer program;
  - third computer instruction means for retrieving data associated with the command from the data modules;

fourth computer instruction means for providing a command and data from the data modules for display;

fifth computer instruction means for redirecting the command and data to be displayed to the remote display terminal using an output redirection handler stored on a computer-readable medium;

sixth computer instruction means for displaying the data on the remote display terminal; and seventh computer instruction means for storing a value representing the current position of a cursor on the remote display terminal such that subsequent commands to display data on the remote display terminal do not require data concerning cursor position, wherein to display text or graphical data, said computer program outputs a token representing the text or graphical data to be displayed, and said third computer instruction means uses the token to retrieve the text or graphical data from said data modules for display on the remote display terminal.

39. A computer program product according to claim 38, wherein said fourth computer instruction means provides data based on a predetermined set of commands, and wherein said fifth computer instruction means, using the predetermined set of commands, redirects the data for display on the remote display terminal.

40. A computer program product according to claim 38 further comprising seventh computer instruction means for transmitting the command and data from said fifth computer instruction means on a data communication link to the remote display terminal.

41. A computer program product according to claim 40, wherein the data communication link is a data communication link selected from the group consisting of parallel, serial, and network, and wherein said seventh computer instruction means formats the commands and data from said fifth computer instruction means for transmission across the data communication link.

42. A computer program product according to claim 40, wherein said sixth computer instruction means receives commands and data from said seventh computer instruction means and controls the remote display terminal to display the data from the computer program.

43. A computer program product according to claim 38, wherein said first computer instruction means provides at least one data module that is a language data module including data strings representing language data, wherein each data string is stored in the language data modules and designated by a token, and wherein to display a data string on the remote terminal display, said second computer instruction means receives a token associated with the data string along with a command to display the data string from the computer program and based on the token said third computer instruction means accesses the data modules and retrieves the data string associated with the token, and wherein said fourth computer instruction means provides the data string and a command to display the data string.

44. A computer program product according to claim 38, wherein said first computer instruction means provides a plurality of language data modules on a computer-readable medium, wherein each language data module includes data strings representing language data in a selected language, and wherein said first computer instruction means further provides a main language module header on a computer-readable medium comprising individual pointers indicating the location in a computer-readable storage medium in which each language data module is located, wherein to display a data string in a selected language, said second computer instruction means receives a token associated with the data string along with a command to display the data string from the computer program, wherein said third computer instruction means accesses the main language module header and retrieves the pointer associated with the language data module corresponding to a preselected desired language for displaying the data string, wherein said third computer instruction means, using the pointer, accesses the language data module and retrieves the data string associated with the token, and wherein said fourth computer instruction means provides the data string for display on the remote display terminal.

45. A computer program product according to claim 38, wherein said first computer instruction means provides a font module stored on a computer-readable medium containing font data for displaying 256 standard and extended ASCII characters.

46. A computer program product according to claim 45, wherein said first computer instruction means provides at least one data module that is a language data module, wherein said first computer instruction means provides:

a string data area stored on a computer-readable medium that includes data strings representing language data, wherein each character of each data string is a character selected from the group consisting of standard ASCII, extended ASCII, and double byte characters;

an extended ASCII font data area stored on a computer-readable medium for storing font data related to extended ASCII characters that are not displayable using the extended ASCII character font data stored in the font module; and a double byte character font data area stored on a computer-readable medium for storing font data related to characters that are double byte characters.

47. A computer program product according to claim 46, wherein said first computer instruction means provides a string data area wherein characters in a data string that are extended ASCII characters and standard ASCII characters, if any, having ASCII codes less than a selected escape code are stored by their ASCII representations in the string data area, while extended ASCII characters and standard ASCII, if any, having ASCII codes at least as great as the selected escape code and ASCII characters that identify the start of 16 bit double byte characters are encoded into 16 bit values and the encoded values are stored in the string data area.

48. A computer program product according to claim 46, wherein said first computer instruction means provides a string data area wherein characters in a data string that are standard ASCII characters and extended ASCII characters having ASCII codes less than a selected escape code are stored by their ASCII representations in the string data area, while extended ASCII characters having ASCII codes at least as great as the selected escape code and ASCII characters that identify the start of 16 bit double byte characters are encoded into 16 bit values and the encoded values are stored in the string data area.

49. A computer program product according to claim 45, wherein said first computer instruction means provides a string data area including double byte characters that are sequentially encoded and the encoded values representing the double byte characters are stored in the string data area, wherein font data associated with the double byte characters is stored in the double byte character font data area, and wherein at least one extended ASCII character is encoded as a 16 bit value in the string data area with an escape code preceding the ASCII representation of the extended ASCII character, and wherein if the extended ASCII character is not displayable with the extended ASCII character font data stored in the font module, data for the extended ASCII character is stored in the extended ASCII font data area.

50. A computer program product according to claim 49, wherein said first computer instruction means provides a string data area including double byte characters that are sequentially encoded such that the first double byte character is represented by a two-byte code having a first byte that is one value greater than the escape code and a second byte equal to zero, and wherein remaining unique double byte characters are encoded with sequential 16 bit code values.

51. A computer program product according to claim 49, wherein to display a data string on a remote display terminal, said second computer instruction means receives the token associated with the data string and a command to display the data string from the computer program and said third computer instruction means accesses the location in the string data area where the data string is located, and wherein said fourth computer instruction means sequentially outputs the characters of the data string along with a command to display the data string.

52. A computer program product according to claim 45, wherein to display an ASCII character, said third computer instruction means locates the font data associated with the ASCII character in the font module, and wherein said fourth computer instruction means, using the font data, outputs the ASCII character to a local display and a command and the character code to the output redirection handler.

53. A computer program product according to claim 38, wherein said first computer instruction means further provides a logo module stored on a computer-readable medium, wherein the logo module contains graphical data for display of at least one logo, wherein when said second computer instruction means receives a command to display the logo, said third computer instruction means locates the graphical data associated with the logo in the logo module, and wherein said fourth computer instruction means, using the logo data, outputs the logo image to the local display and a command and data necessary to display a representation of the logo to the output redirection handler.

54. A computer program product according to claim 38, wherein said fourth computer instruction means provides data for displaying a progress bar and a command to display the progress bar representation.

55. A computer program product according to claim 38, wherein said fourth computer instruction means provides data for displaying a box defining an area on a display terminal and a command to display the box.

56. A computer program product according to claim 55, wherein said fourth computer instruction means provides data for displaying a box defining an area on a display terminal and data to be displayed within the defined area of the box, and wherein said fourth computer instruction means provides a command to scroll the data displayed within the defined area, while any data displayed on other portions of the remote display terminal remain at the same position.

57. A system for redirecting to a remote display terminal information output by a BIOS POST computer program directed to a first display terminal such that the information can also be displayed at the remote display terminal comprising:

a BIOS POST computer program that contains at least one token stored therein representing one of text data and graphical data to be displayed during operation of said computer program;

a display management module stored on a computer-readable medium in communication with an output of the BIOS POST computer program and the remote display terminal for displaying data from the computer program on a display terminal;

data modules stored on a computer-readable medium containing text data and graphical data representations used by the computer program to display information on a display terminal, wherein at least one of said text data and graphical data representations corresponds to the token stored in said BIOS POST computer program;

an output redirection handler stored on a computer-readable medium in communication with said display management module;

a data communication link connected between said output redirection handler and the remote display terminal; and a remote display handler stored on a computer-readable medium in communication with the data communication link and the remote display terminal, wherein said display management module receives commands to display data from the computer program, and wherein said display management module, based on the commands from the computer program, provides commands and data from said data modules to said output redirection handler for displaying information on the remote display terminal, wherein to display text or graphical data, said BIOS POST computer program outputs a token representing the text or graphical data to be displayed, and said display management module uses the token to retrieve the text or graphical data from said data modules for display on the remote display terminal, and wherein said remote display handler stores a current attribute value representing a color attribute of the characters being displayed on the remote display terminal such that subsequent commands to display data on the remote display terminal that do not alter the attribute do not require transmittal of the attribute variable.

58. A system according to claim 57, wherein said display management module provides data and commands based on a predetermined set of commands, and wherein said output redirection handler communicates with said display management module using the predetermined set of commands and provides the commands and data to the remote display handler for display on the remote display terminal.

59. A system for redirecting to a remote display terminal information output by a BIOS POST computer program directed to a first display terminal such that the information can also be displayed at the remote display terminal comprising:

a BIOS POST computer program that contains at least one token stored therein representing one of text data and graphical data to be displayed during operation of said computer program;

a display management module stored on a computer-readable medium in communication with an output of the BIOS POST computer program and the remote display terminal for displaying data from the computer program on a display terminal;

data modules stored on a computer-readable medium containing text data and graphical data representations used by the computer program to display information on a display terminal, wherein at least one of said text data and graphical data representations corresponds to the token stored in said BIOS POST computer program;

an output redirection handler stored on a computer-readable medium in communication with said display management module;

a data communication link connected between said output redirection handler and the remote display terminal; and a remote display handler stored on a computer-readable medium in communication with the data communication link and the remote display terminal, wherein said display management module receives commands to display data from the computer program, and wherein said display management module, based on the commands from the computer program, provides commands and data from said data modules to said output redirection handler for displaying information on the remote display terminal, wherein to display text or graphical data, said BIOS POST computer program outputs a token representing the text or graphical data to be displayed, and said display management module uses the token to retrieve the text or graphical data from said data modules for display on the remote display terminal, and wherein said remote display handler stores a value representing the current position of a cursor on the remote display terminal such that subsequent commands to display data on the remote display terminal do not require data concerning cursor position.

60. A system according to claim 59, wherein at least one data module is a language data module including data strings representing language data, wherein each data string is stored in said data modules and designated by a token, and wherein to display a data string, said display management module receives a token associated with the data string from the computer program and a command to display the data string and based on the token accesses said language data module, retrieves the data string associated with the token, and outputs the data string and a command to display the data string to said output redirection handler.

61. A system according to claim 59 further comprising:

a plurality of language data modules associated with said display management module, wherein each language data module includes data strings representing language data in a selected language; and a main language module header stored on a computer-readable medium and associated with said display management module comprising individual pointers indicating the location in a computer-readable storage medium in which each language data module is located, wherein to display a data string in a selected language, said display management module receives a token associated with the data string and a command to display the data string, wherein said display management module accesses said main language module header and retrieves the pointer associated with the language data module corresponding to a preselected desired language for displaying the data string, and wherein said display management module using the pointer, accesses the language data module, retrieves the data string associated with the token, and outputs the data string in the desired language and a command to display the data string to said output redirection handler.

62. A system according to claim 60 further comprising a font module stored on a computer-readable medium containing font data for displaying 256 standard and extended ASCII characters.

63. A system according to claim 59 further comprising a logo module stored in a computer-readable medium and associated with said display management module, wherein said logo module contains graphical data for display of at least one logo, and wherein when said display management module receives a command to display the logo, said display management module locates the graphical data associated with the logo in said logo module and outputs the logo image to a local display and a command and data necessary to display a representation of the logo to the output redirection handler.

64. A system according to claim 59 wherein said display management module outputs data for displaying a progress bar and a command to display a representation of the progress bar to said output redirection handler.

65. A system according to claim 59, wherein said display management module outputs data for displaying a box defining an area on a display terminal and a command to display the box to said output redirection handler.

66. A system according to claim 65, wherein said display management module outputs data for displaying a box defining an area on a display terminal, wherein said display management module further outputs data to be displayed within the defined area of the box, and wherein said display management module outputs commands to scroll the data displayed within the defined area, while any data displayed on other portions of the remote display terminal remain at the same position.

67. A system for redirecting to a remote display terminal information output by a computer program directed to a first display terminal such that the information can also be displayed at the remote display terminal comprising:

a computer program that contains at least one token stored therein representing one of text data and graphical data to be displayed during operation of said computer program;

a display management module stored on a computer-readable medium in communication with an output of the computer program and the remote display terminal for displaying data output from the computer program directed to the first display terminal to the remote display terminal;

data modules stored on a computer-readable medium containing text data and graphical data representations used by the computer program to display information on a display terminal, wherein at least one of said text data and graphical data representations corresponds to the token stored in said computer program;

an output redirection handler stored on a computer-readable medium in communication with said display management module;

a data communication link connected between said output redirection handler and the remote display terminal; and a remote display handler stored on a computer-readable medium in communication with the data communication link and the remote display terminal, wherein said display management module receives commands to display data from the computer program, and wherein said display management module, based on the commands from the computer program, provides commands and data from said data modules to said output redirection handler, wherein said output redirection handler receives the information from said display management module and provides the information to the remote display terminal for display, wherein to display text or graphical data, said computer program outputs a token representing the text or graphical data to be displayed, and said display management module uses the token to retrieve the text or graphical data from said data modules for display on the remote display terminal, and wherein said remote display handler stores a value representing the current position of a cursor on the remote display terminal such that subsequent commands to display data on the remote display terminal do not require data concerning cursor position.

68. A method for redirecting to a remote display terminal information output by a computer program directed to a first display terminal such that the information can also be displayed at the remote display terminal comprising the steps of:

providing a computer program that contains at least one token stored therein representing one of text data and graphical data to be displayed during operation of said computer program;

providing on a computer-readable medium data modules containing text and graphical representation data used by the computer program to display information, wherein at least one of said text data and graphical data representations corresponds to the token stored in said computer program;

receiving a command to display data from the computer program;

retrieving data associated with the command from the data modules;

providing a command and data from the data modules for display;

redirecting the command and data to be displayed to the remote display terminal an using an output redirection handler stored on a computer-readable medium;

transmitting the command and data from said redirecting step on a data communication link to the remote display terminal; and displaying the data on the remote display terminal, wherein to display text or graphical data, said computer program outputs a token representing the text or graphical data to be displayed, and said retrieving step uses the token to retrieve the text or graphical data from said data modules for display on the remote display terminal, wherein said providing a command and data step provides data based on a predetermined set of commands, and wherein said redirecting step, using the predetermined set of commands, redirects the data to the remote display terminal, and wherein said displaying step receives commands and data from said transmitting step and controls the remote display terminal to display the data from the computer program.

69. A computer program product for redirecting to a remote display terminal information output by a computer program directed to a first display terminal such that the information can also be displayed at the remote display terminal, wherein the computer program product comprises:

a computer-readable storage medium having computer readable program code means embodied in said medium, said computer-readable program code means comprising:

computer program that contains at least one token stored therein representing one of text data and graphical data to be displayed during operation of said computer program;

first computer instruction means for providing on a computer-readable medium data modules containing text and graphical data used by the computer program to display text information and a representation of graphical images on the remote display terminal, wherein at least one of said text data and graphical data representations corresponds to the token stored in said computer program;

second computer instruction means for receiving a command to display data from the computer program;

third computer instruction means for retrieving data associated with the command from the data modules;

fourth computer instruction means for providing a command and data from the data modules for display;

fifth computer instruction means for redirecting the command and data to be displayed to the remote display terminal using an output redirection handler stored on a computer-readable medium;

sixth computer instruction means for displaying the data on the remote display terminal; and seventh computer instruction means for storing a current attribute value representing a color attribute of the characters being displayed on the remote display terminal such that subsequent commands to display data on the remote display terminal from said fourth computer instruction means that do not alter the attribute do not require output of the attribute variable, wherein to display text or graphical data, said computer program outputs a token representing the text or graphical data to be displayed, and said third computer instruction means uses the token to retrieve the text or graphical data from said data modules for display on the remote display terminal.

* * * * *